US012147625B2

(12) United States Patent
Astley et al.

(10) Patent No.: US 12,147,625 B2
(45) Date of Patent: Nov. 19, 2024

(54) FLEXIBLE TOUCH PANEL WITH PIEZOELECTRIC FORCE SENSING

(71) Applicant: Cambridge Touch Technologies Ltd, Cambridge (GB)

(72) Inventors: Michael Astley, Cambridge (GB); Xiang Cheng, Cambridge (GB); Arokia Nathan, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 41 days.

(21) Appl. No.: 17/627,101

(22) PCT Filed: Jul. 3, 2020

(86) PCT No.: PCT/GB2020/051601
§ 371 (c)(1),
(2) Date: Jan. 13, 2022

(87) PCT Pub. No.: WO2021/009480
PCT Pub. Date: Jan. 21, 2021

(65) Prior Publication Data
US 2022/0374097 A1 Nov. 24, 2022

(30) Foreign Application Priority Data
Jul. 15, 2019 (GB) ...................................... 1910126

(51) Int. Cl.
*G06F 3/044* (2006.01)
*G01L 1/16* (2006.01)
(Continued)

(52) U.S. Cl.
CPC .......... *G06F 3/0416* (2013.01); *G06F 3/0412* (2013.01); *G06F 3/0414* (2013.01);
(Continued)

(58) Field of Classification Search
CPC .......... G01L 1/16; G06F 3/041; G06F 3/0412; G06F 3/0414; G06F 3/0416; G06F 3/044;
(Continued)

(56) References Cited

U.S. PATENT DOCUMENTS 11,474,653 B2 10/2022 Marques et al.
2006/0019752 A1 1/2006 Ohta
(Continued)

FOREIGN PATENT DOCUMENTS

CN 1938669 A 3/2007
CN 108463790 A 8/2018
(Continued)

OTHER PUBLICATIONS

Combined Search and Examination Report under Sections 17 and 18(3) for UK application No. GB 1915369.1 dated Jul. 7, 2020, 13 pages.
(Continued)

*Primary Examiner* — Julie Anne Watko

(57) ABSTRACT

An apparatus and associated methods utilize a flexible touch panel having a layer of piezoelectric material arranged between a number of first electrodes and at least one second electrode and a device connected to the first electrodes and configured to determine a bending state of the touch panel based on one or more radii of curvature of the touch panel from signals received from one or more of the first electrodes. A touch location for one or more user interactions is determined from signals received from the one or more of the first electrodes. An electronic device including the apparatus may switch between operating modes based on the bending state of the touch panel. A non-transitory computer readable medium may store computer programs implementing the methods for determining the bending state of the
(Continued)

touch panel, switching the device between modes based on the bending state and determining a touch location.

14 Claims, 12 Drawing Sheets

(51) Int. Cl.
*G06F 3/041* (2006.01)
*G06F 3/04886* (2022.01)

(52) U.S. Cl.
CPC .............. *G01L 1/16* (2013.01); *G06F 3/044* (2013.01); *G06F 3/04886* (2013.01); *G06F 2203/04102* (2013.01); *G06F 2203/04104* (2013.01); *G06F 2203/04105* (2013.01)

(58) Field of Classification Search
CPC ....... G06F 3/04886; G06F 2203/04102; G06F 2203/04104; G06F 2203/04105
See application file for complete search history.

(56) References Cited

U.S. PATENT DOCUMENTS

| | | |
|---|---|---|
| 2006/0197750 A1 | 9/2006 | Kerr et al. |
| 2007/0205997 A1 | 9/2007 | Lieshout et al. |
| 2009/0293631 A1* | 12/2009 | Radivojevic ......... H10N 30/302 73/774 |
| 2010/0079384 A1 | 4/2010 | Grivna |
| 2013/0027153 A1 | 1/2013 | Shin et al. |
| 2013/0176265 A1 | 7/2013 | Zurek et al. |
| 2015/0160770 A1 | 6/2015 | Stewart et al. |
| 2015/0248149 A1* | 9/2015 | Yamazaki ............. G06F 3/0488 361/679.27 |
| 2016/0378203 A1 | 12/2016 | Kim et al. |
| 2016/0381014 A1* | 12/2016 | Kim ..................... G06F 1/1652 726/7 |
| 2017/0090659 A1* | 3/2017 | Shiozaki ............... G06F 1/1677 |
| 2017/0262099 A1 | 9/2017 | Nathan et al. |
| 2017/0308200 A1 | 10/2017 | Mugiraneza et al. |
| 2017/0338287 A1* | 11/2017 | Ito ........................ G06F 3/0446 |
| 2018/0299958 A1 | 10/2018 | Wang et al. |
| 2018/0307365 A1 | 10/2018 | Chen |
| 2019/0027807 A1 | 1/2019 | Choi et al. |
| 2019/0191582 A1 | 6/2019 | Olien et al. |
| 2020/0033205 A1 | 1/2020 | Mori |
| 2020/0240809 A1 | 7/2020 | Nagamori |
| 2021/0124458 A1 | 4/2021 | Marques et al. |

FOREIGN PATENT DOCUMENTS

| | | |
|---|---|---|
| EP | 2816453 A1 | 12/2014 |
| EP | 3246806 A1 | 11/2017 |
| KR | 20170000309 A1 | 1/2017 |
| WO | 2005093548 A1 | 10/2005 |
| WO | 2006072670 A1 | 7/2006 |
| WO | 2009144363 A1 | 12/2009 |
| WO | 2010098992 A1 | 9/2010 |
| WO | 2014098946 A1 | 6/2014 |
| WO | 2016102975 A2 | 6/2016 |
| WO | 2016208857 A1 | 12/2016 |
| WO | 2017109455 A1 | 6/2017 |
| WO | 2019021856 A1 | 1/2019 |

OTHER PUBLICATIONS

Non final Office Action in U.S. Appl. No. 17/077,123 Marques et al., USPTO, dated Mar. 3, 2022, 18 pages.
International Search Report and Written Opinion, dated Sep. 21, 2020 directed to International application No. PCT/GB2020/051601, 14 pages.
Combined Search and Examination Report under Sections 17 and 18(3) for UK application No. GB 1910126.0 dated Dec. 16, 2019, 6 pages.
Communication pursuant to Article 94(3) EPC in examination of European Patent Application No. EP20739445.3 (EP stage of PCT/GB2020/051601) European Patent Office, dated Mar. 14, 2024, 5 pages.
Office Action directed to Chinese Application No. 202080048900.7 by Astley, et al. (National stage of PCT GB2020/051601), China National Intellectual Property Administration, dated Dec. 14, 2023, 35 pages including attached translation.

* cited by examiner

FLEXIBLE TOUCH PANEL WITH PIEZOELECTRIC FORCE SENSING

RELATED APPLICATIONS

This application is a 35 U. S. C. § 371 application of PCT Application No. PCT/GB2020/051601, filed Jul. 3, 2020, which claims priority to United Kingdom application No. 1910126.0 filed Jul. 15, 2019, each of which is hereby incorporated by reference as if fully disclosed herein.

FIELD

The present invention relates to a flexible touch panel for force sensing. The present invention relates in particular to sensing bending of a flexible touch panel and controlling an operation mode of a device incorporating the flexible touch panel in dependence on the bending.

BACKGROUND

Touch screen panels having force-sensing capabilities can enhance user experience through three-dimensional multi-touch interaction.

In a touch panel, drive and sensing electrodes are used for projective capacitive touch detection. To add force-detection capabilities, a piezoelectric layer, an electrode (which is may be the drive or sensing electrode) and a counter electrode, which is held at a fixed voltage or ground, are employed. Additional dielectric layers such as PET thin film, adhesives and a protective cover may be included to integrate the layers and provide mechanical protection of electrode structures. Together, the configuration of the layers in the sensor stack defines a sensor architecture.

Examples of touch sensors combining capacitive sensing with piezoelectric based force-detection are described in WO 2016/102975 A1. This document also describes examples of embedded touch panels (in which electrodes are interspersed with display elements such as polarisers etc), in which a patterned electrode is positioned between a user input surface and the drive and sensing electrodes. Further examples of touch sensors combining capacitive sensing with piezoelectric based force-detection capabilities are described in WO 2017/109455 A1.

Recently, there has been interest in producing displays which are flexible, see for example WO 2010/098992 (A1) and WO 2006/072670 (A1). Sufficient flexibility may permit such displays to be folded-up or rolled-up for storage. The attraction of such flexible displays is to provide a larger display area without having to increase the overall size of a device including the flexible display. Such flexible displays may receive input from flexible touch panels laminated to, or integrated with the flexible display panel.

SUMMARY

According to a first aspect of the invention there is provided an apparatus including a flexible touch panel. The flexible touch panel includes a layer of piezoelectric material arranged between a number of first electrodes and at least one second electrode. The apparatus also includes a device connected to the first electrodes and configured to determine a bending state corresponding to one or more radii of curvature of the flexible touch panel based on signals received from one or more of the first electrodes.

A bending state may corresponding to a radius of curvature of less than or equal to a largest dimension of the flexible touch panel. A bending state does not correspond to a user interaction such as a tap, swipe, press and so forth. The device may be a touch controller. The device may include one or more digital electronic processors and memory. The flexible touch panel may be supported on, or within, a frame which includes one or more hinges, the frame and the flexible touch panel being foldable about each hinge.

The frame may extend around the perimeter of the flexible touch panel. The frame may include one or more support panels. Each support panel may retain a portion of the flexible touch panel in contact with that support panel. Each support panel may be bonded to a contacting portion of the flexible touch panel across some or all of the area of the support panel. The support panel or support panels may leave a gap around each hinge. The frame may permit the flexible touch panel to curve in a region around each hinge.

The device may also be configured to determine a bending state comprising an angle of each hinge.

The device may also be configured to, for each hinge, determine a bending state comprising a closed status in response to the frame and the flexible touch panel being folded about that hinge, and determine a bending state comprising an opened status in response to the frame and the flexible touch panel being unfolded about that hinge.

The frame and the flexible touch panel may be folded about a hinge if that hinge makes an angle of less than a folded (or closed) angle. The folded angle may be less than or equal to 45 degrees, less than or equal to 30 degrees, less than or equal to 10 degrees, or less than or equal to 5 degrees. The frame and the flexible touch panel may be unfolded about a hinge if that hinge makes an angle of more than an unfolded (or opened) angle. The unfolded angle may be greater than or equal to 135 degrees, greater than or equal to 150 degrees, greater than or equal to 170 degrees, or greater than or equal to 175 degrees.

The device may be configured to determine a bending state of the flexible touch panel based on a duration for which signals received from one or more first electrodes corresponding to a hinge are saturated.

The device may be configured to determine a bending state of the flexible touch panel based on a total charge and/or a rate of charge generated on one or more first electrodes corresponding to a hinge.

A given first electrode may correspond to a given hinge if the given first electrode lies within a predetermined distance of the hinge, or spans across the hinge.

The flexible touch panel may be configured to enable the apparatus to be rolled-up into a substantially cylindrical configuration. The flexible touch panel and the apparatus may be capable of being rolled up into a scroll-like configuration. The substantially cylindrical configuration may correspond to a predetermined radius of curvature.

The apparatus may also include a roller about which the flexible touch panel is configured to be wrapped. The flexible touch panel may be connected to the roller along all or part of one edge of the flexible touch panel.

The device may be configured to determine a bending state comprising a fraction of the flexible touch panel which is rolled up in the substantially cylindrical configuration and/or a fraction of the flexible touch panel which is unrolled.

The flexible touch panel may include first electrodes oriented substantially parallel to an axial direction of the substantially cylindrical configuration. The flexible touch panel may include first electrodes oriented at an angle of less than 30 degrees, less than 15 degrees, less than 10 degrees or less than 5 degrees to the axial direction of the substantially cylindrical configuration. The device may be configured to determine when a region of the flexible, touch panel corresponding to a particular first electrode transitions between the substantially cylindrical configuration and an unrolled state based on signals received from that first electrode.

The frame may include one or more displays. A display included in the frame may be rigid or flexible. A display may be a liquid crystal display. A display may be a plasma display. A display may be an organic light emitting diode display. A display may be an electronic ink display. A display may be an electrophoretic display.

The flexible touch panel may be laminated to a flexible display. The flexible touch panel may be integrally formed with a flexible display. A flexible display may be an organic light emitting diode display. A flexible display may be an electronic ink display. A flexible display may be an electrophoretic display.

The electronic device may be configured to switch between two or more operating modes in dependence upon the determined bending state of the flexible touch panel.

The electronic device may be configured to enter a low power mode in response to determining a bending state corresponding to one or more radii of curvature of the flexible touch panel is less than a first predetermined threshold. The electronic device may be configured to enter a full power mode in response to determining a bending state corresponding to one or more radii of curvature of the flexible touch panel is greater than a second predetermined threshold.

The second predetermined threshold may be equal to the first predetermined threshold. The second predetermined threshold may be greater than the first predetermined threshold. The low power mode may include switching off the display.

The low power mode may include using a secondary display to display notifications. A secondary display may be smaller than a main display. A secondary display may be of a different type to a main display. For example, a main display may be an organic light emitting diode display and a secondary display may be an electronic ink display or a black and white liquid crystal display. A secondary display may have a lower resolution than a main display.

The frame may include one hinge, and the electronic device may be configured to operate in a tablet mode in response to determining that the angle of the hinge is more than an unfolded angle, and to operate in a laptop mode in response to determining that the angle of the hinge is between the unfolded angle and a folded angle.

The folded angle may be less than the unfolded angle. The folded angle may be less than or equal to 45 degrees, less than or equal to 30 degrees, less than or equal to 10 degrees, or less than or equal to 5 degrees. The unfolded angle may be greater than or equal to 135 degrees, greater than or equal to 150 degrees, greater than or equal to 170 degrees, or greater than or equal to 175 degrees. In the tablet mode, a first region of the flexible touch panel on one side of the hinge and a second region of the flexible touch ter panel on the other side of the hinge may both function to provide touchscreen input to the display. In the laptop mode, a first display region laminated to or integrated with the first region of the flexible touch panel may display output and the first region of the flexible touch panel may be used to provide touchscreen input. In the laptop mode, a second display region laminated to or integrated with the second region of the flexible touch panel may display a keyboard, a track-pad, a slider and/or other input controls, and the second region of the flexible touch panel may be used to provide keyboard, track-pad, slider and/or other input respectively.

The electronic device may be configured to only receive touchscreen input from a fraction of the flexible touch panel which is unrolled. The electronic device may be configured to only display output using a region of the flexible display corresponding to the fraction of the flexible touch panel which is unrolled. The device may be further configured to scale output from an application and/or operating system executed by one or more processors of the electronic device to fit on the fraction of the flexible display corresponding to the fraction of the flexible touch panel which is unrolled.

According to a second aspect of the invention, there is provided a method including receiving signals from one or more first electrodes of a flexible touch panel. The flexible touch panel includes a layer of piezoelectric material arranged between a plurality of first electrodes and at least one second electrode. The method also includes determining a bending state corresponding to one or more radii of curvature of the flexible touch panel based on the received signals.

The flexible touch panel may be supported within a frame which comprises one or more hinges, the frame and the flexible touch panel being foldable about each binge.

The method may also include, for each hinge, determining a bending state comprising a closed status in response to the frame and the flexible touch panel being folded about that hinge, and determining a bending state comprising an opened status in response to the frame and the flexible touch panel being unfolded about that hinge.

The flexible touch panel may be configured to enable the flexible touch panel to be rolled-up into a substantially cylindrical configuration.

The method may also include determining a fraction of the flexible touch panel which is rolled up in the substantially cylindrical configuration and/or a fraction of the flexible touch panel which is unrolled.

The flexible touch panel may be associated with a display.

The flexible touch panel and the display may be included in an electronic device. The method may also include causing the electronic device to switch between two or more operating modes in dependence upon the bending state of the flexible touch panel.

The method may also include causing the electronic device to enter a low power mode in response to determining a bending state corresponding to one or more radii of curvature of the flexible touch panel is less than a first predetermined threshold. The method may also include causing the electronic device to enter a full power mode in response to determining a bending state corresponding to one or more radii of curvature of the flexible touch panel is greater than a second predetermined threshold.

The method, the flexible touch panel, the flexible display and/or the electronic device may include features corresponding to any features of the first aspect.

According to a third aspect of the invention, there is provided a non-transitory computer readable medium storing a computer program configured such that, when the computer program is executed by a data processing apparatus, the data processing apparatus is caused to carry out the method according to the second aspect.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Touchscreen panels including a layer of piezoelectric material for force sensing have been described which have been bonded to, or integrated within, rigid displays. A rigid display is a conventional feature of a smart-phone, tablet computer, laptop computer, and so forth.

The present specification is based, at least in part, on the inventors realisation that integrating a layer of piezoelectric material into a flexible touchscreen panel may enable additional functionality in addition to, or instead of, detecting the force applied by a user interaction. In particular, a layer of piezoelectric material within a flexible touch panel may enable simple, integrated detection of events including, but not limited to folding, unfolding, rolling and/or un-rolling of the flexible touch panel. A layer of piezoelectric material may also be used to monitor an angle between two flat portions of a flexible touch panel.

In addition to flexible touchscreens, the methods and apparatuses of the present specification are also applicable to a touch panel which is not bonded to, or integrated with, a display, and which is instead used as an input per to another device.

Figure 1:
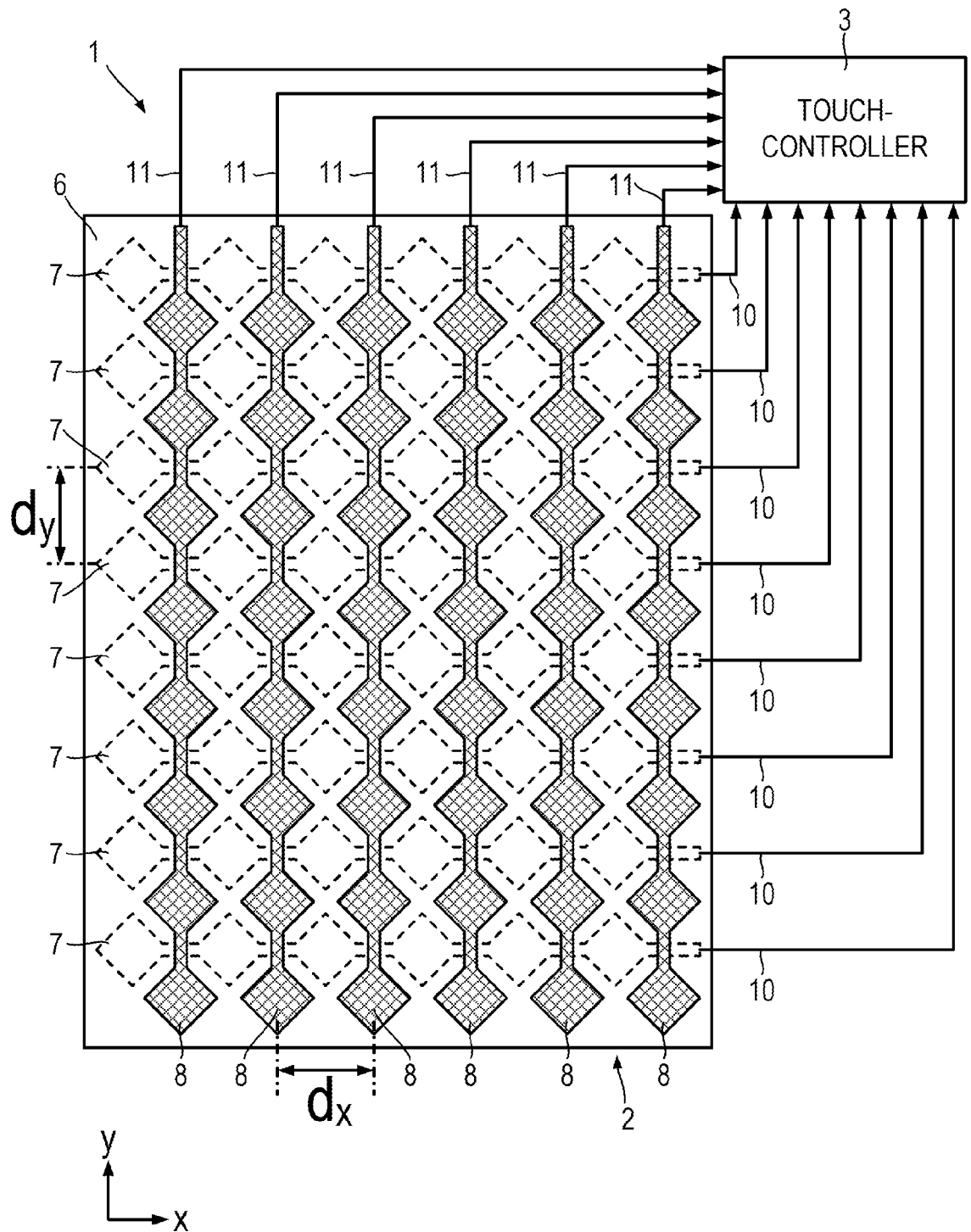
FIG. 1 is a plan view of a force-sensing touch panel system.
Figure 2:
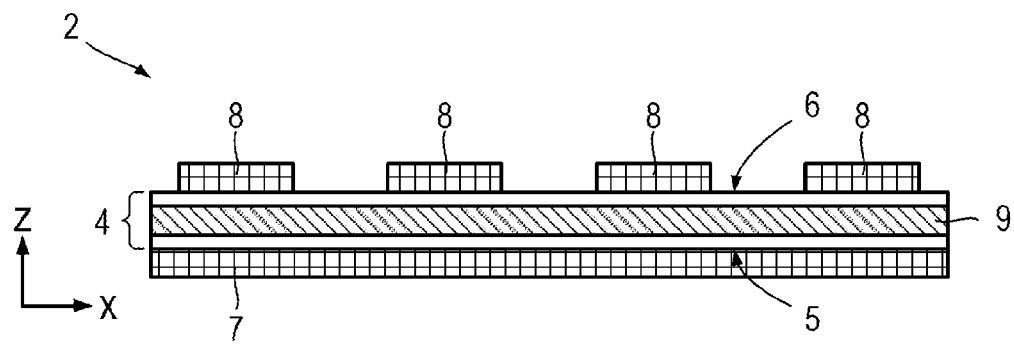
FIG. 2 is a cross-section of a first flexible force-sensing touch panel.

Referring to FIGS. 1 and 2, an example of a force sensing touch panel system 1 (also referred to as touch panel system 1) is shown.

The touch panel system 1 includes a first flexible force-sensing touch panel 2 (also referred to as first flexible touch panel 2) and a force-sensing touch-controller 3 (also referred to as touch-controller 3).

The first flexible touch panel 2 includes a layer structure 4 having a first face 5 and a second, opposite, face 6, a number of first electrodes 7 and a number of second electrodes 8.

The layer structure 4 includes one or more layers, including at least a layer of piezoelectric material 9. Each layer included in the layer structure 4 is generally planar and extends in first x and second y directions which are perpendicular to a thickness direction z. The one or more layers of the layer structure 4 are arranged between the first and second faces 5, 6 such that the thickness direction z of each layer of the layer structure 4 is perpendicular to the first and second faces 5, 6. The first electrodes 7 are disposed on the first face 5, of the layer structure 4, and the second electrodes 8 are disposed on the second face 6 of the layer structure 4.

In this way, when an applied force causes the touch panel 2 to deform, a resulting piezoelectric polarisation generated in the layer of piezoelectric material 9 will induce potential differences between the first and second electrodes 7, 8. Charges will flow to/from the first and second electrodes 7, 8 to cancel out the polarisation electric field, and the touch controller 3 measures charge values corresponding to each first and second electrode 7, 8, for example using one or more charge amplifiers. Based on the measured induced charges, the touch controller 3 may estimate the locations corresponding to one or more user interactions, as well as the corresponding applied forces.

Optionally, the touch controller 3 may use the first and second electrodes 7, 8 as transmitting and/or receiving electrodes for conventional mutual capacitance measurements. When the touch controller 3 performs capacitance measurements, these may be alternated with piezoelectric force measurements, or may be simultaneous (concurrent) with piezoelectric force measurements. For example, for concurrent force and capacitance measurements, the touch controller 3 may be configured as described in WO 2017/109455 A1, or as described in WO 2016/102975 A2, and the entire contents of both documents are hereby incorporated by reference. In particular, suitable combined force and capacitance touch panel systems are shown in, and described with reference to, FIGS. 4 to 23 of WO 2017/109455 A1. Furthermore, suitable combined force and capacitance touch panel systems are shown in, and described with reference to, FIGS. 15 to 29 of WO 2016/102975 A2.

In other examples, the touch controller 3 may determine the positions of one or more user interactions entirely using conventional capacitance measurements conducted using the first and second electrodes 7, 8, in such examples, the touch controller 3 may use piezoelectric signals from the first and second electrodes 7, 8 solely to determine a bending state of the first flexible touch panel 2.

The first touch panel 2 is flexible, in the sense that the first flexible touch panel 2 may be bent to a radius of curvature of 10 mm, or less without experiencing significant plastic deformation or other damage during 100,000 or more cycles of bending and unbending. In some examples, "flexible" may correspond to the ability to reversibly deform to a radius of curvature of between 5 to 10 mm. In other examples, "flexible" may correspond to the ability to reversibly deform to a radius of curvature of between to 5 mm.

The first electrodes 7 each extend in the first direction x and the first electrodes 7 are disposed in an array evenly spaced in the second direction p with a pitch $d_y$. The second electrodes 8 each extend in the second direction y and the second electrodes 8 are disposed in an array evenly spaced in the first direction x with a pitch $d_x$. In this example, the pitches $d_x$ and $d_y$ are equal, although in other examples electrode pitches $d_x$ and $d_y$ need not be equal. The first and second electrodes 7, 8 take the form of diamond-patterned electrodes known from mutual-capacitance based touchscreens. Each first electrode 7 is electrically coupled to the touch controller 3 via respective traces 10, and each second electrode 8 is coupled to the touch controller 3 via respective traces 11. In this way, the first and second electrodes 7, 8 define a Cartesian coordinate system, which may be employed for sensing a location of a force applied to the touch panel 2. The location is an x, y coordinate, i.e. the coordinate system defined by the first and second electrodes 7, 8 lies in an x-y plane, perpendicular to the thickness direction z. As mentioned hereinbefore, location of one or more user interactions may be based on piezoelectric force measurements and/or capacitance measurements.

Preferably, the piezoelectric material 9 is a piezoelectric polymer such as polyvinylidene fluoride (PVDF). However, the piezoelectric material 9 may alternatively be provided by any piezoelectric material which may be made sufficiently flexible. In practice, this corresponds to a suitable piezoelectric material being capable of being made thin enough to bend without cracking, whilst still providing a detectable signal from the electrodes 7, 8. The first and second electrodes 7, 8 may be indium tin oxide (ITO) or indium zinc oxide (IZO). However, the first and second electrodes 7, 8 may be metal films such as aluminium, copper, silver or other metals suitable for deposition and patterning as a thin film. The first and second electrodes 7, 8 may be conductive polymers such as polyaniline, polythiphene, polypyrrole or poly(3,4-ethylenedioxythiophene) polystyrene sulfonate (PEDOT/PSS). For flexibility, the first and second electrodes 7, 8 may preferably be formed from a metal mesh; nanowires, optionally silver nanowires; graphene; and/or carbon nanotubes.

If the piezoelectric material 9 is manufactured by a monoaxial stretching method, then it may have a higher piezoelectric coefficient in parallel to the machined direction.

When using such materials, it may be beneficial to align the machined direction having a higher piezoelectric coefficient to be perpendicular to a bending/folding, axis, in order to increase a piezoelectric signal generated in response to bending/folding about the bend n gild ding axis.

The conductive traces 10, it may be made of the same materials as the first and second electrodes 7, 8. Alternatively, the conductive traces to, it may be made of a material having a higher conductivity than the material used for the first and second electrodes 7. The conductive traces to, it are generally much thinner in the plane defined by the first and second directions x, y than the corresponding first and/or second electrodes 7, 8.

The layer structure 4 may include only the layer of piezoelectric material 9, such that the first and second opposite faces 5, 6 are faces of the layer of piezoelectric material 9. This structure is preferred for a flexible touch panel 2, because each additional layer increases thickness of the first flexible touch panel 2, which is detrimental to flexibility.

Alternatively, the layer structure 4 may include one or more dielectric layers 12 (FIG. 3) which are stacked between the layer of piezoelectric material 9 and the first face 5 of the layer structure 4. The layer structure 4 may include one or more dielectric layers 12 (FIG. 3) stacked between the second face 6 of the layer structure 4 and the layer of piezoelectric material 9. Preferably, one or more dielectric layer(s) 12 (FIG. 3) include layers of a polymer dielectric material such as polyethylene terephthalate (PET), or layers of pressure sensitive adhesive (PSA) material. However, one or more dielectric layer(s) (FIG. 3) may include layers of a ceramic insulating material such as aluminium oxide, it these may be produced with sufficient flexibility.

When the first touch panel 2 is intended to overlie a display, all of the components of the first touch panel 2 overlying said display should preferably be formed of transparent materials, or have dimensions thin enough to avoid obscuring the display, or be aligned with gaps between pixels of the display.

Although in practice, the first and second electrodes 7, 8 are typically formed into an orthogonal Cartesian grid, this is not essential. The first and second electrodes 7, 8 may meet at any angle and still provide a coordinate system. In general, the first and second electrodes 7, 8 may be shaped to define any coordinate system suitable for locating user interactions with the first flexible touch panel 2.

First and second electrodes 7, 8 forming a diamond-pattern are not required, and other shapes may be used, including simple rectangular electrodes 7, 8.

Figure 3:
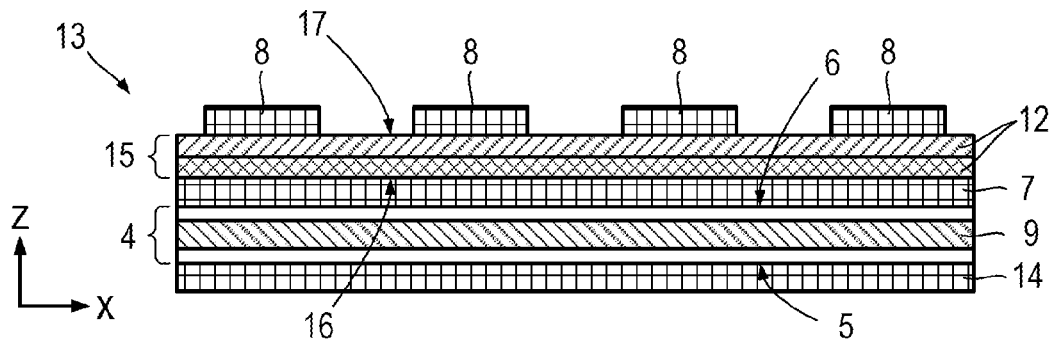
FIG. 3 is a cross-section of a second flexible force-sensing touch panel.

Referring also to FIG. 3, a second flexible force-sensing touch panel 13 (also referred to as the second flexible touch panel 13) is shown.

The second touch panel 13 includes the layer structure 4, the first electrodes 7 and the second electrodes 8, and additionally includes a counter electrode 14 (sometimes also referred to as a "common electrode") and a second layer structure 15 having third and fourth opposite faces 16, 17. The layout of the first and second electrodes 7, 8 in plan view is the same as for the first flexible touch panel 2.

In contrast to the first flexible touch panel 2, the first and second electrodes 7, 8 are spaced apart by the second layer structure in the second flexible touch panel 13. In the second flexible touch panel 13, the first and second electrodes 7, 8 are both on the same side of the layer of piezoelectric material 9. In this way, when an applied force causes the touch panel 2 to deform, resulting piezoelectric polarisation generated in the layer of piezoelectric material 9 will induce potential differences between the counter electrode 14 and the first electrodes 7, and between the counter electrode 14 and the second electrodes 8. The counter electrode 14 may be patterned or unpatterned, and takes the form of a single conductive region in either case. The counter electrode 14 is substantially co-extensive with the coordinate system defined, by the first and second electrodes 7, 8.

The counter electrode 14 is made of indium tin oxide (ITO) or indium zinc oxide (IZO). Alternatively, the counter electrode 14 may be a metal mesh film such as aluminium, copper, silver or other metals suitable for deposition and patterning as a thin film. The counter electrode 14 may be made of a conductive polymer such as polyaniline, polythiphene, polypyrrole or poly(3,4-ethylenedioxythiophene) polystyrene sulfonate (PEDOT/PSS).

The second layer structure 15 includes one or more dielectric layers 12. Preferably, the number of dielectric layers 12 is minimised to maintain flexibility of the second flexible touch panel 13. Each dielectric layer 12 is generally planar and extends in first x and second y directions perpendicular to the thickness direction z. The one or more dielectric layers 12 of the second layer structure 15 are arranged between the third and fourth faces 16, 17 such that the thickness direction z of each dielectric layer 12 of the second layer structure 15 is perpendicular to the third and fourth faces 16, 17. The second electrodes 8 are disposed on the fourth face 17 of the second layer structure 15. The first electrodes 7 may be supported on the second face 6 of the first layer structure 4 or on the first face 16 of the second layer structure 15.

Preferably, the dielectric layer(s) 12 include layers of a polymer dielectric material such as PET or layers of PSA materials. However, the dielectric layer(s) 12 may include layers of a ceramic insulating material such as aluminium oxide, if these may be produced with sufficient flexibility.

Figure 4:
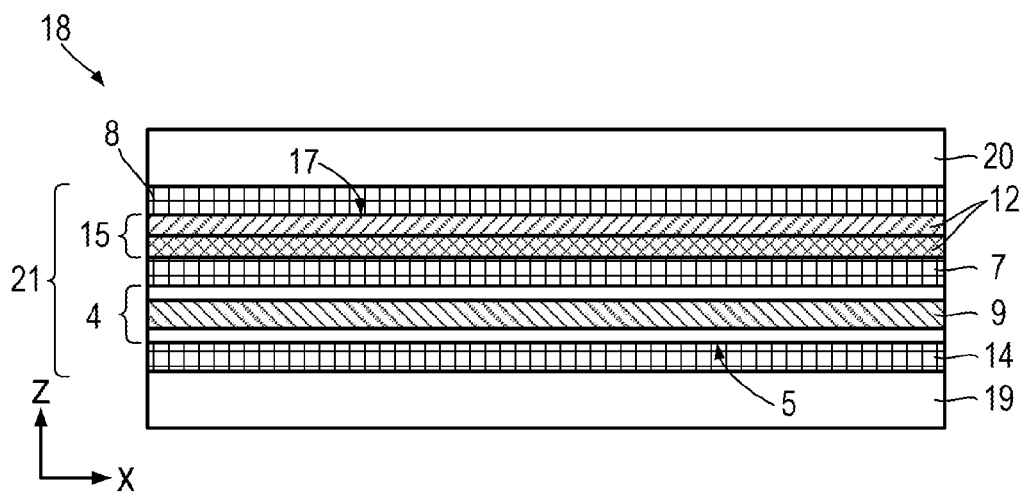
FIG. 4 is a cross-section of a flexible force-sensing touchscreen.

Referring also to FIG. 4, a flexible force-sensing touchscreen 18 (also referred to as the flexible touchscreen 36) is shown.

The flexible touchscreen 18 includes a flexible touch panel 21 stacked between a flexible display 19 and a flexible protective cover 20. In the example shown in FIG. 4, the flexible touch panel 21 is the second flexible touch panel 13. Although the example shown in FIG. 4 includes the second flexible touch panel 13 with the counter electrode 14 closer to the display 19, in other examples, the orientation of the second flexible touch panel 13 may be reversed in the thickness direction z. When a counter electrode 14 is closest to the cover 20, the counter electrode 14 may be patterned to prevent electrostatic screening of the first and second electrodes 7, 8.

In other examples, the flexible touch panel 21 may be the first flexible touch panel 2, or any other suitable flexible touch panel which includes a layer of piezoelectric material 9. In general, the flexible touch panel 21 may be reversible in the thickness direction z.

The flexible display 19 may be any type of flexible display such as, for example, an organic light-emitting diode (OLED) display, a liquid crystal display (LCD), a plasma display, an electrophoretic display, and so forth. The cover 20 is typically formed from a flexible polymer. Preferably, the cover 20 is flexible, whilst also being resistant to scratching, for example polycarbonate.

Although shown in FIG. 4 as being laminated to the flexible display 19, in other examples of a flexible touchscreen 18 the flexible touch panel 21 may be integrally formed with the flexible display 19.

In some examples, the flexible display 19 may emit light from both sides.

Figure 5:
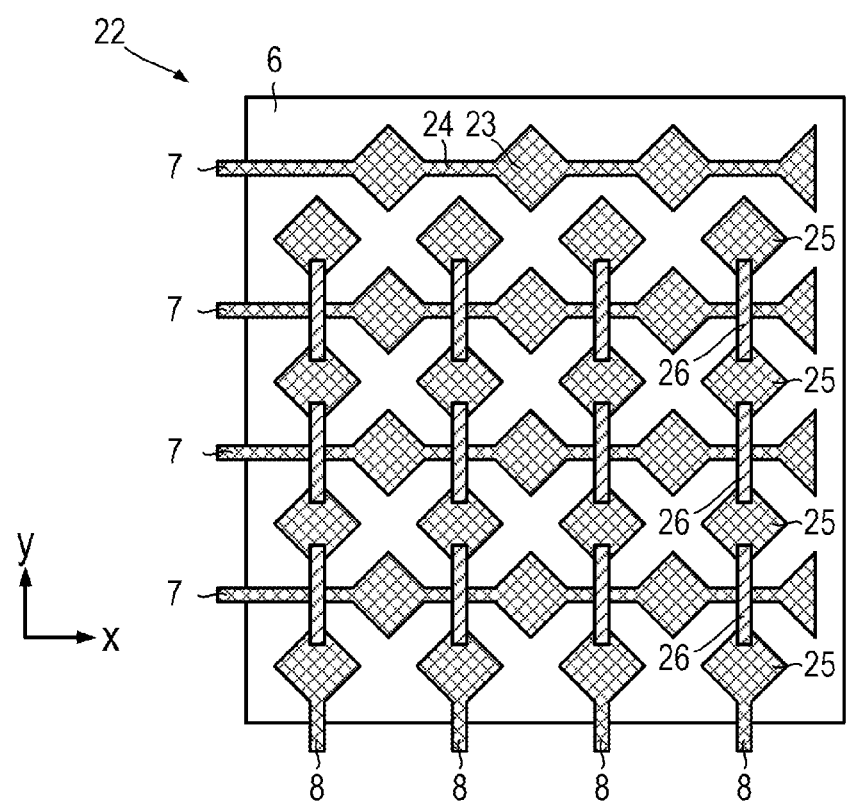
FIG. 5 is a plan view of a third flexible force-sensing touch panel.

Referring also FIG. 5, a third flexible force-sensing touch panel 22 (also referred to as the third flexible touch panel 22) is shown.

The third flexible touch panel 22 is the same as the second flexible touch panel 13, except that the second layer structure 15 is omitted, and the first and second electrodes 7, 8 are disposed in a co-planer configuration on the second face 6 of the first layer structure 4. Each first electrode 7 is a continuous conductive region extending in the first direction x, including several diamond segments 23 evenly spaced in the first direction x and connected to one another in the first direction x by relatively narrower bridging segments 24. Each second electrode 8 includes several diamond-shaped pad segments 25 evenly spaced in the second direction y in the similar way to the first electrodes 7. However, unlike the first electrodes 7, the diamond-shaped pad segments 25 of the second electrodes 8 are interspersed with, and separated by, the first electrodes 7. The diamond-shaped pad segments 25 corresponding to each second electrode 8 are connected together by conductive jumpers 26. The jumpers 26 each span a part of a first electrode 7 and the jumpers 26 are insulated from the first electrodes 7 by a thin layer of dielectric material (not shown) which may be localised to the area around the intersection of the jumper 26 and the first electrode 7.

Alternatively, a thin (<10 μm) dielectric layer (not shown) may overlie the second face 6 of the first layer structure 4 and the first and second electrodes 7, 8. Conductive traces (not shown) extending in the second direction y may be disposed over the dielectric layer (not shown), each conductive trace (not shown) overlying the diamond-shaped pad segments 51 making up one second electrode 8. The overlying conductive traces (not shown) may connect the diamond-shaped pad segments 25 making up each second electrode 8 using vias (not shown) formed through the thin (<10 μm) dielectric layer (not shown).

The third flexible touch panel 3 may provide the flexible touch panel 21 of the flexible touchscreen 18.

Figure 6:
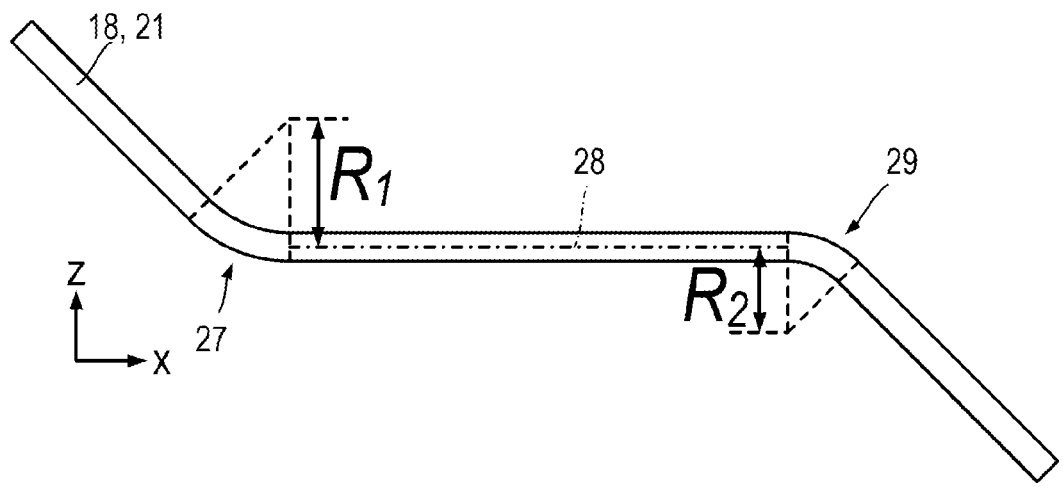
FIG. 6 illustrates bending of a flexible touchscreen of flexible touch panel.

Referring also to FIG. 6, bending of a flexible touch panel 21, or a flexible touchscreen 18 including a flexible touch panel 21 is shown.

A first bend 27 has a radius of curvature $R_1$, measured with respect to a neutral axis 28 of the flexible touchscreen 18 or flexible touch panel 21. A second bend 29 has a radius of curvature $R_2$ measured with respect to a neutral axis 28 of the flexible touchscreen 18 or flexible touch panel 21.

For clarity of illustration, the neutral axis 28 of the flexible touchscreen 18 or flexible touch panel 21 is only explicitly shown in a central, un-deformed region of the flexible touchscreen 18 or flexible touch panel 21. Although drawn at the central thickness of the flexible touchscreen 18 or flexible touch panel 21, in practice the neutral axis 28 does not need to run through the central thickness of flexible touchscreen 18 or flexible touch panel 21. For example, the neutral axis 28 will not be central unless the layers forming the flexible touchscreen 18 or flexible touch panel 21 have mirror symmetry about a central plane.

In addition to determining locations of user interactions and/or applied forces, the touch controller 3 may also use the piezoelectric signals generated in the first and second electrodes 7, 8 to estimate one of more radii of curvature $R_1$, $R_2$ of the flexible touchscreen 18 or flexible touch panel 21, or changes in the radii of curvature $R_1$, $R_2$. As the flexible touchscreen 18 or flexible touch panel 21 is deformed, piezoelectric signals will be generated provided that the piezoelectric layer 9 is displaced from the neutral axis 28. The strains resulting from bending of the flexible touchscreen 18 or flexible touch panel 21 will be substantially larger than the strains resulting from a normal user interaction with the flexible touchscreen 18 or flexible touch panel 21. This difference in the typical amplitude of piezoelectric signals for user interactions and for bending may be used by the touch controller 3 to differentiate and track bending of the flexible touchscreen 18 or flexible touch panel 21. Additionally, because of the spatial resolution available using the first and second electrodes 7, 8 it may be possible to tract multiple bends 27, 29 in a flexible touch panel. Moreover, the spatial pattern of bending the flexible touchscreen 18 or flexible touch panel 21 to a radius $R_1$, $R_2$ about an implied origin may be further differentiated from conventional use interactions such as taps, swipes and so forth by the different spatial patterns of which electrodes 7, 8 generate piezoelectric signals.

For example, a conventional tap will generate piezoelectric signals from a cluster of first and second electrodes 7, 8 near to the tapped location. By contrast, deforming the flexible touchscreen 18 or flexible touch panel 21 into the bending state shown in FIG. 6 will excite piezoelectric signals in all of the first electrodes 7, as all of the first electrodes 7 run perpendicular to the first and second bends 27, 29. At the same time, two clusters of second electrodes 8 proximate to the first and second bends 27, 29 respectively will provide piezoelectric signals to the touch controller 3.

In dependence on one or more radii of curvature which the touch controller 3 measures for the flexible touchscreen 18 or flexible touch panel 21, an electronic device 30 (FIG. 7) incorporating the flexible touchscreen 18 or flexible touch panel 21 may switch between two or more operating modes. For example, the electronic device 30 may switch to an idle or sleep mode when folded up, then wake-up to full functionality when unfolded to an open configuration.

In general terms, determining a radius of curvature of a flexible touch panel 21 based on signals received from one or more of the electrodes 7, 8 should be understood to encompass determining any bending state of the flexible touch panel 21 or a flexible touchscreen 18 incorporating the flexible touch panel 21. Bending states may include, hut are not limited to, a folded, unfolded, partially unfolded, rolled, unrolled or partially unrolled state of the flexible touchscreen 18 or flexible touch panel 21. A bending state may also include an angle between two portions of the flexible touchscreen 18 or flexible touch panel 21. Any determined bending state is physically linked to a radius of curvature or a range thereof, such that determining that a flexible touchscreen 18 or flexible touch panel 21 is rolled up is equivalent to determining that a radius of curvature of the flexible touchscreen 18 or flexible touch panel 21 is within a certain range. However, a numerical estimate of a corresponding radius of curvature may or may not be generated during the process of determining a bending state.

First Electronic Device

Figure 7:
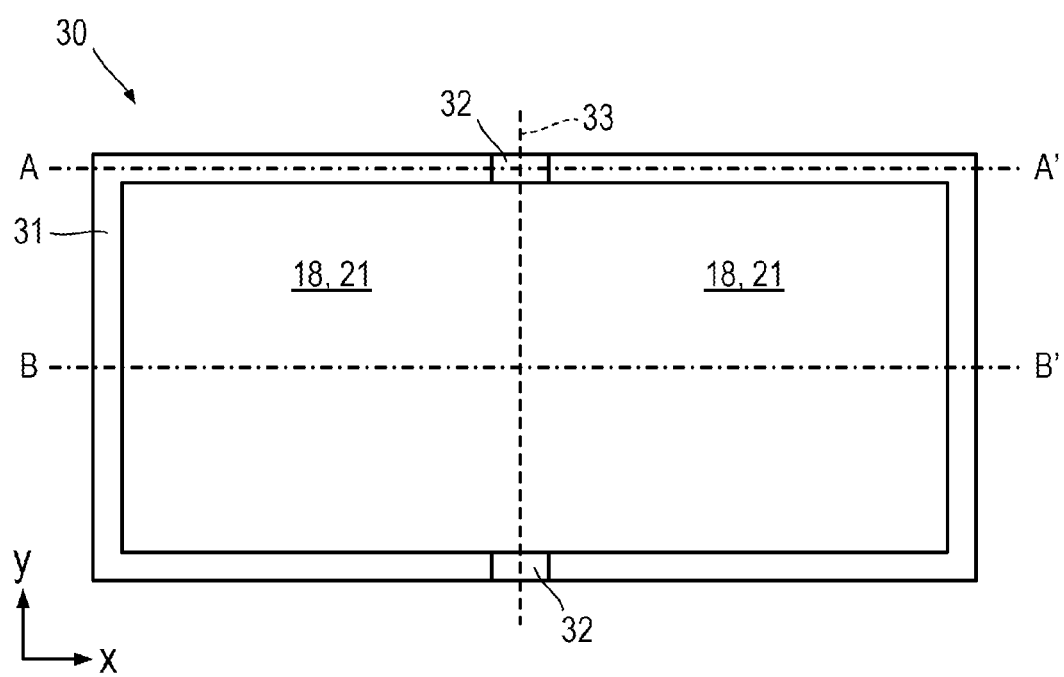
FIG. 7 is a plan view of a first electronic device.

Referring also to FIG. 7, a first electronic device 30 is shown in an open, unfolded or flat configuration.

Figure 8A:
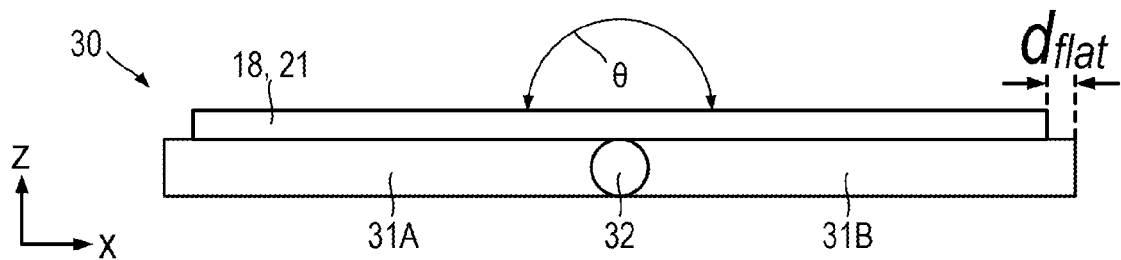
FIGS. 8A and 8B are cross sections along lines labelled A-A' and B-B' in FIG. 7.

Referring also to FIG. 8A, a cross-section of the first electronic device 30 is shown along the line labelled A-A' in FIG. 7.

Figure 8B:
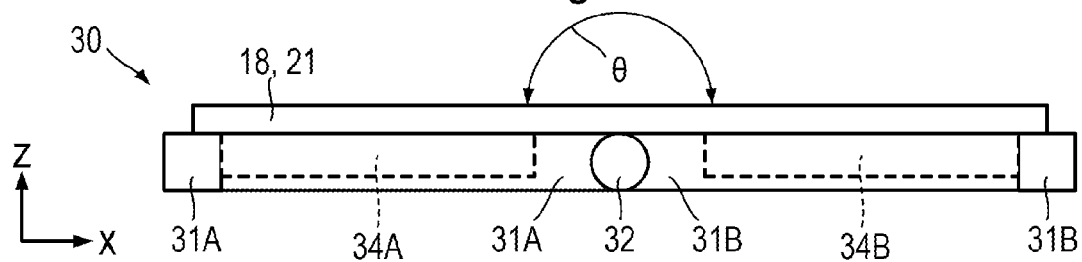

Referring also to FIG. 8B, a cross-section of the first electronic device 30 is shown along the line labelled B-B' in FIG. 7.

In the first electronic device 30, the flexible touchscreen 18 or flexible touch panel 21 is supported by (or within) a frame 31 which includes a hinge 32. The hinge 32 enables the frame 31 and the supported flexible touchscreen 18 or flexible touch panel 21 to be folded about a hinge axis 33. The frame 31 is provided in first and second portions 31A, 31B, which are joined at the hinge 32. The hinge 32 may take the form of several physical hinges spaced apart from one another, but for the purposes of explanation all physical hinges along a single hinge axis 33 shall be referred to as a single hinge 32.

The frame 31 may extend around the perimeter of the flexible touchscreen 18 or flexible touch panel 21. In some examples, the frame 31 may include one or more support panels 34, the flexible touchscreen 18 or flexible touch panel 21 may be retained in contact with the support panels 34, for example by physical constraints which permit sliding (FIGS. 9A, 9B) or by bonding (or otherwise securing) the support panels 34 to the flexible touchscreen 18 or flexible touch panel 21 (FIG. 10A, 10B). In any event the support panels 34 should leave space about the hinge axis 33 to avoid an excessively small bending radius $R_1$, $R_2$ for the flexible touchscreen 18 or flexible touch panel 21. In some examples, support panels 34 may be integrally formed as extensions of the frame portions 31A, 31B.

By designing the electronic device 30 to have first or second electrodes 7, 8 in parallel with the hinge axis 33, maximum signal will be generated on the first or second electrodes 7, 8 corresponding in position to the hinge 32 about which the folding and unfolding happens. Therefore, reading the signal from a single first or second electrode 7, 8 positioned corresponding to the hinge 32 will have the least gain requirements for the touch controller 3. Due to the relatively large amount of charge generated from a first or second electrode 7, 8 positioned corresponding to the hinge 32, it may be beneficial for low power applications if the touch controller 3 monitors such electrodes, for example, if the bending signal about the hinge is used to wake an electronic device from a low-power idle or sleep mode.

However, monitoring first or second electrodes 7, 8 which span across the hinge 32 may be beneficial for noise reduction, as the same signal should be seen on all of the first or second electrodes 7, 8 which span across the hinge 32. The additional signal-to-noise of such a configuration may be useful if the amount of charge is being tracked, for example, in order to estimate a folding angle θ about the hinge 32. In the open, unfolded or flat configuration, the angle is θ=180°.

In some examples, the frame 31 may support (or contain) a flexible touchscreen 18 which includes a flexible touch panel 18 laminated to, or integrally formed with, a flexible display 19. In other examples, the frame 31 may support a flexible touch panel 21 and the frame 31 and/or support panels 34 may include (or take the form of), one of more rigid or flexible displays. A display included in the frame 31 or a support panel 34 may be a liquid crystal display, a plasma display, an organic light emitting diode display, an electronic ink display, an electrophoretic display, and so forth.

Although a single hinge 32 is shown in FIGS. 7, 8A and 88, in other examples two or more hinges 32 may be included in the frame 31. The touch controller 3 may track the angle θ of each hinge separately.

When the frame 31 folds about the hinge(s) 32 by an angle θ, there are several alternatives for how the flexible touchscreen 18 or flexible touch panel 21 may adopt a corresponding configuration. These options depend on the mechanical constraints applied to the flexible touchscreen 18 or flexible touch panel 21 by the frame 31 and/or the support panels 34.

Figure 9A:
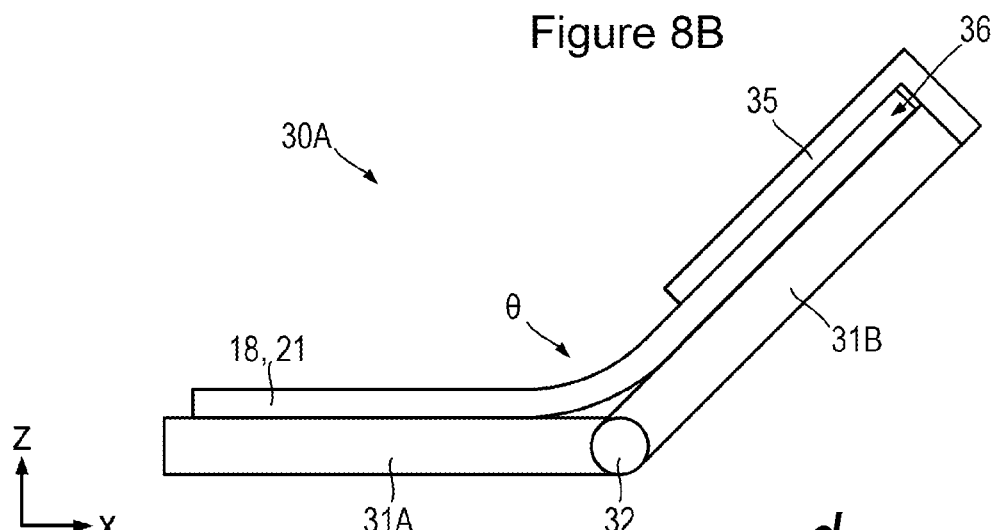
FIGS. 9A and 9B are cross sections of a partly folded first configuration of the electronic device shown in FIG. 7, along lines labelled A-A' and B-B' in FIG. 7.
Figure 9B:
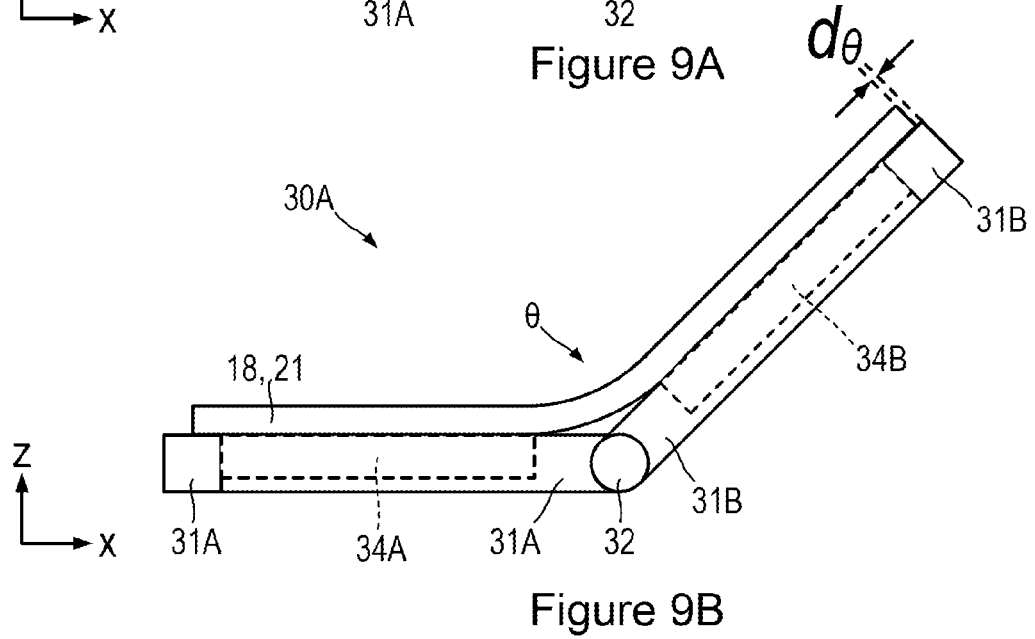
Figure 10A:
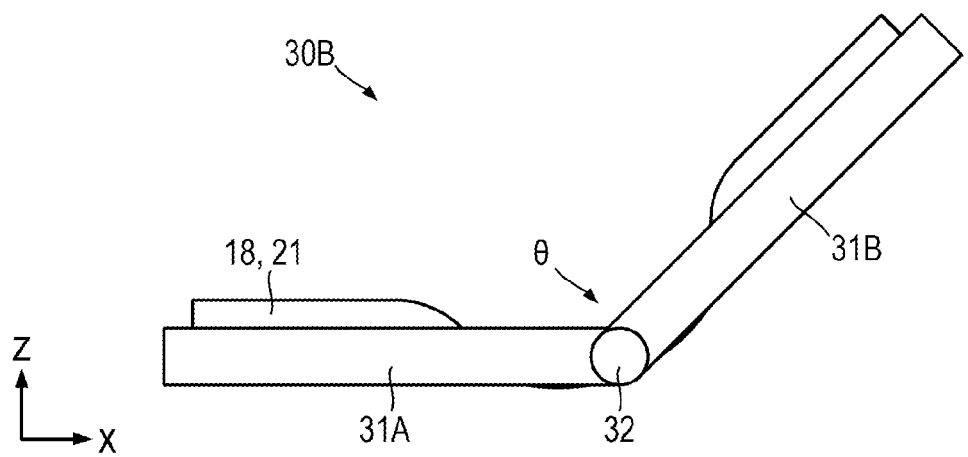
FIGS. 10A and 10B are cross sections of a partly folded second configuration of the electronic device shown in FIG. r, along lines labelled A-A' and B-B' in FIG. 7.
Figure 10B:
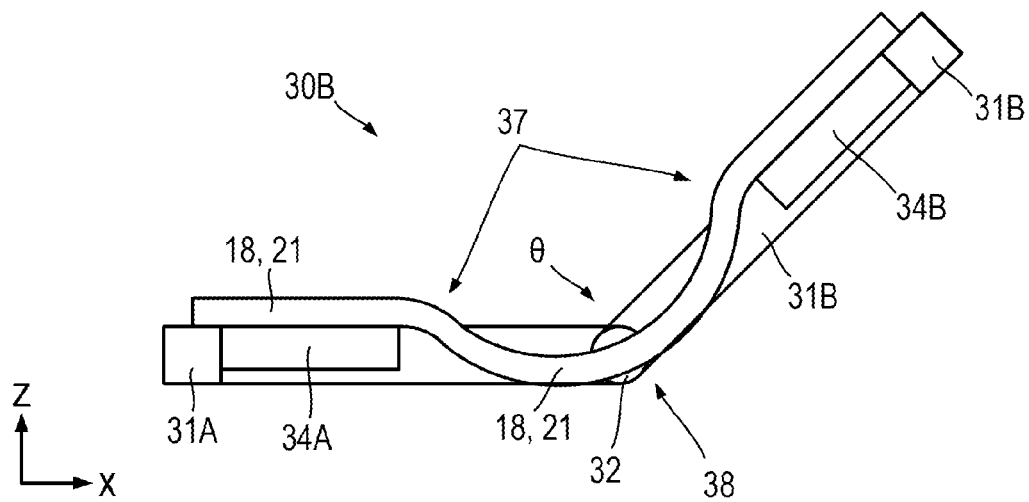

Referring also to FIGS. 9A and 9B, cross sections of a first configuration 30A are shown respectively for the lines A-A' and B-B' in FIG. 7.

In the first configuration 30A, the flexible touchscreen 18 or flexible touch panel 21 is securely attached (for example bonded or glued) to the first frame portion 31A (and optionally a corresponding first support panel 34A), whilst being able to slide relative to the second frame portion 31B (and optionally a corresponding second support panel 34B).

For example, referring again to FIG. 8A, in the flat configuration an edge of the flexible touchscreen 18 or flexible touch panel 21 may be a distance $d_{flat}$ in the first direction x from the edge of the second frame portion 31B. Referring in particular to FIG. 9B, as the electronic device in the first configuration 30A is bent about the hinge 32, the distance between the edges of the flexible touchscreen 18 or flexible touch panel 21 and the edge of the second frame portion 31B may be decreased to a distance $d_0 < d_{flat}$ as the flexible touchscreen 18 or flexible touch panel 21 slides with respect to the second frame portion 31B (and optionally the second support panel 34B).

One option for retaining the flexible touchscreen 18 or flexible touch panel 21 in contact with the second frame portion 31B is to include a retaining lip 35 at the edges of the second frame portion 31B, to form a channel 36 which receives the edges of the flexible touchscreen 18 or flexible touch panel 21. A spring (not shown) may be positioned in the channel 36 in order to maintain a biasing force on the edge of the flexible touchscreen 18 or flexible touch panel 21.

An advantage of the first configuration 30A is that a radius of curvature of the flexible touchscreen 18 or flexible touch panel 21 about the hinge 32 and binge axis 33 may be maximised for a particular angle θ. Whilst this reduces the maximum piezoelectric signal generated from bending, the reduced strain may help to extend the lifetime of the flexible touchscreen 18 or flexible touch panel 21.

Referring also to FIGS. 10A and 10B, cross sections of a second configuration 30B are shown respectively for the lines A-A' and B-B' in FIG. 7.

In the second configuration 308, the flexible touchscreen 18 or flexible touch panel 21 is securely attached to the first frame portion 31A and a first supporting panel 34A. The flexible touchscreen 18 or flexible touch panel 21 are also securely attached to the second frame portion 31B and a second supporting panel 34B. The first supporting panel 34A extends partway from a distal end of the first frame portion 31A towards the hinge 32, and the second supporting panel 34B extends partway from a distal end of the second frame portion 31B towards the hinge 32. The support panels 34A, 34B leave a gap about the hinge 32 to permit bending of the flexible touchscreen 18 or flexible touch panel 21. The support panels 34A, 34B may be extensions of the respective frame portions 33A, 31B.

As the device in the second configuration 30B is folded about the hinge 32, the flexible touchscreen 18 or flexible touch panel 21 cannot slide, and instead buckles inwards towards the hinge 32 at first bend points 37, before bending in the same sense as the hinge 32 about a second, re-curved bend point 38. The frame portions 31A, 31B and/or the supporting panels 34A, 34B may be shaped to ensure that upon bending the flexible touchscreen 18 or flexible touch panel 21 buckles inwards towards the hinge 32, instead of outwards away from the hinge 32. Additionally or alternatively, the flexible touchscreen 18 or flexible touch panel 21 may be pre-stressed when it is bonded to the frame portions 31A, 31B, to ensure that buckling occurs in a desired direction.

Compared to the first configuration 30A, the second configuration 30B may be associated with a smaller radius of curvature $R_1$, $R_2$, for a given angle θ, at least for angles closer to a flat configuration with θ=180. As the frame portions 31A, 31B fold back on themselves, the difference between the first and second configurations 30A, 30B may become less significant.

The methods of the present specification are not limited to the first and second configurations 30A, 30B. The methods of the present specification are considered to be applicable to any configuration of a frame 31 supporting a flexible touchscreen 18 or flexible touch panel 21 to enable bending about one or more hinges 32.

Figure 11:
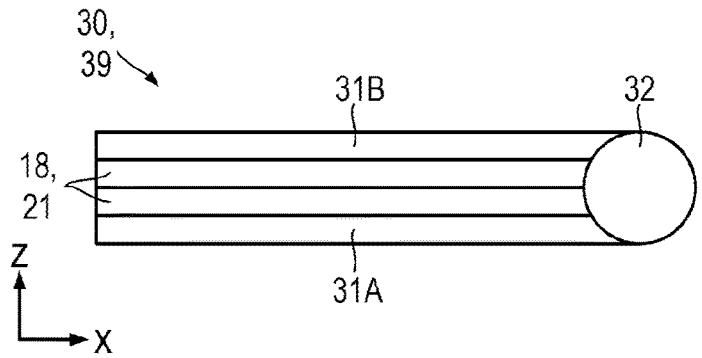
FIG. 11 illustrates a folded state of a first electronic device.

Referring also to FIG. 11, a folded or closed configuration 39 of the first electronic device 30 is shown.

The folded or closed configuration 39 corresponds to the hinge 32 being moved to an angle θ which is less than a threshold closed angle $\theta_{close}$, for example the threshold closed angle $\theta_{close}$ may be substantially equal to zero so that the first electronic device 30 is folded back on itself as shown in FIG. 11.

In practice, the threshold closed angle $\theta_{close}$ may be larger than zero, for example, the threshold closed angle $\theta_{open}$ may be less than or equal to 45 degrees, less than or equal to 30 degrees, less than or equal to 10 degrees, or less than or equal to 5 degrees.

Figure 12:
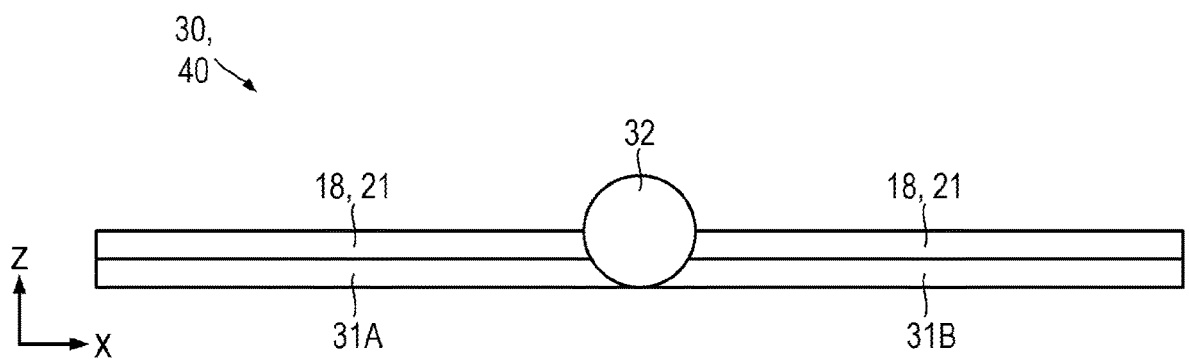
FIG. 12 illustrates an unfolded state of a first electronic device.

Referring also to FIG. 12, an unfolded, open r flat configuration 40 of the first electronic device 30 is shown.

The unfolded, open or flat configuration 40 corresponds to the hinge 32 being moved to an angle θ which is more than a threshold open angle $\theta_{open}$, for example the threshold ss open angle $\theta_{open}$ may be substantially equal to 180° (π) so that the first electronic device 30 is opened out flat as shown in FIG. 12.

In practice, the threshold open angle $\theta_{open}$ may be less than 180°(π), for example the threshold open angle $\theta_{open}$ may be greater than or equal to 135 degrees, greater than or equal to 150 degrees, greater than or equal to 170 degrees, or greater than or equal to 175 degrees.

Figure 13:
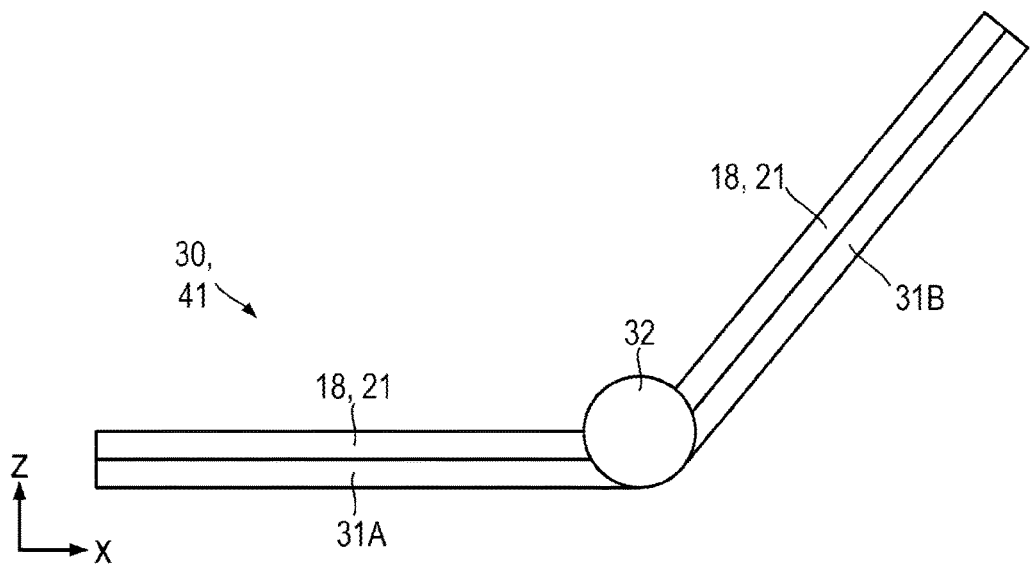
FIG. 13 illustrates an intermediate state of a first electronic device.

Referring also to FIG. 13, an intermediate configuration 41 of the first electronic device 30 is shown.

The intermediate configuration 41 corresponds to the hinge 32 being moved to an angle θ which is between the threshold closed angle $\theta_{close}$ and the threshold open angle $\theta_{open}$, i.e. $\theta_{close} < \theta < \theta_{open}$.

In some examples, the touch controller 3 may simply be configured to detect folding of the first electronic device 30 into the folded configuration 39 and unfolding of the first electronic device 30 into the unfolded configuration 40. However, in other examples, the touch controller 3 may alternatively track an estimated radius of curvature $R_1$, $R_2$ of the flexible touchscreen 18 or flexible touch panel 21, for example by tracking a total charge on one or more first and/or second electrodes 7, 8. The estimated radii of curvature $R_1$, $R_2$ may be mapped to corresponding angles θ based on calibration experiments moving the flexible touchscreen 18 or flexible touch panel 21 from a known configuration 39, 40 to an intermediate configuration 41 of known angle θ, Subsequently, the electronic device 30 may use the estimated angle θ to control an operating mode of the electronic device 30.

In other examples, the touch controller 3 may track an estimated radius of curvature $R_1$, $R_2$ of the flexible touchscreen 18 or flexible touch panel 21 based on a duration for which an output of one or more charge amplifiers connected to respective first or second electrodes 7, 8 have become saturated.

In some examples, explicit determination of the radii of curvature $R_1$, $R_2$ may be omitted, and the piezoelectric signals mapped directly to corresponding angles θ. In other examples, explicit determination of the radii of curvature $R_1$, $R_2$ and the corresponding angles θ may be omitted, and the piezoelectric signals mapped directly to corresponding operating modes of the first electronic device 30.

Controlling Operating Modes of the First Electronic Device

The touch controller 3 may control an operating mode of the first electronic device 30 in a variety of ways, based on an imposed radius of curvature of the flexible touchscreen 18 or flexible touch panel 21 and the corresponding angle θ, as detected using the piezoelectric material layer 9 and electrodes 7, 8.

For example, the touch controller 3 may determine whether the electronic device 30 is in the closed configuration 39, or whether the electronic device is in an opened configuration. An opened configuration may correspond to the flat or unfolded configuration 40 or an opened configuration may correspond to anything other than the closed configuration 39, i.e. either one of the flat or unfolded configuration 40 or the intermediate configuration 41.

The first electronic device 30 may be configured to enter a low power mode, or sleep mode, in response to determining that the electronic device 30 is in a closed configuration 39. For example, in a low power mode, the display 19 may be de-activated and the touch controller 3 may power down a capacitive touch sensing mode carried out using the first and second electrodes 7, 8.

In some examples, the first electronic device 30 may include a secondary display (not shown) which is mounted on, or integrated into, a surface of the frame 31 or a support panel 34 opposite to the flexible touchscreen 18 of flexible touch panel 21. In this way, the secondary display (not shown) remains visible when the first electronic device 30 is in the folded or closed configuration 39. In the low power mode, the secondary display (not shown) may be used to display notifications, for example, to inform a user that a message or e-mail used been received. Typically, a secondary display (not shown) will be smaller than a main display such as flexible display 19, and the secondary display (not shown) may be of a different type and/or a lower resolution than a main display. For example, a main display may be an organic light emitting diode display and a secondary display (not shown) may be an electronic ink display or a black and white liquid crystal display.

The first electronic device 30 may be configured to operate in more than two modes in dependence on the radius of curvature of the flexible touchscreen 18 or flexible touch panel 21 and the corresponding angle θ.

For example, in addition to being configured to enter a low power mode, or sleep mode, in response to determining that the electronic device 30 is in a closed configuration 39, the first electronic device 30 may be configured to operate in a tablet mode in response to determining the flat, unfolded or open configuration 40 and to operate in a laptop mode in response to determining the intermediate configuration 41.

In the tablet mode, a first region of the flexible touchscreen 18 or flexible touch panel 21 on one side of the hinge, for example overlying the first frame portion 31A, functions to provide touchscreen input. Similarly, a second region of the flexible touch panel on the other side of the hinge, for example overlying the second frame portion 31B, also provides touchscreen input.

In the laptop mode, a first display region laminated to or integrated with the first region of the flexible touch panel displays output and the first region of the flexible touch panel is used to provide touchscreen input, whereas a second display region laminated to or integrated with the second region of the flexible touch panel displays a keyboard, a track-pad, a slider and/or other input controls, and the second region of the flexible touch panel is used to provide keyboard, track-pad, slider and/or other input respectively.

The control of an electronic device 30 based on a radius of curvature of the flexible touchscreen 18 or flexible touch panel 21 and the corresponding angle θ about a hinge 32 is not limited to the hereinbefore described examples, and more and/or different operating modes of the first electronic device 30 may be implemented based on the estimated radius of curvature of the flexible touchscreen 18 or flexible touch panel 21 obtained using piezoelectric signals.

The functionality of controlling an electronic device 30 based on a radius of curvature of the flexible touchscreen 18 or flexible touch panel 21 and the corresponding angle θ about a hinge 32 may also be integrated with detecting the forces and/or locations applied by one or more user interactions.

Figure 14:
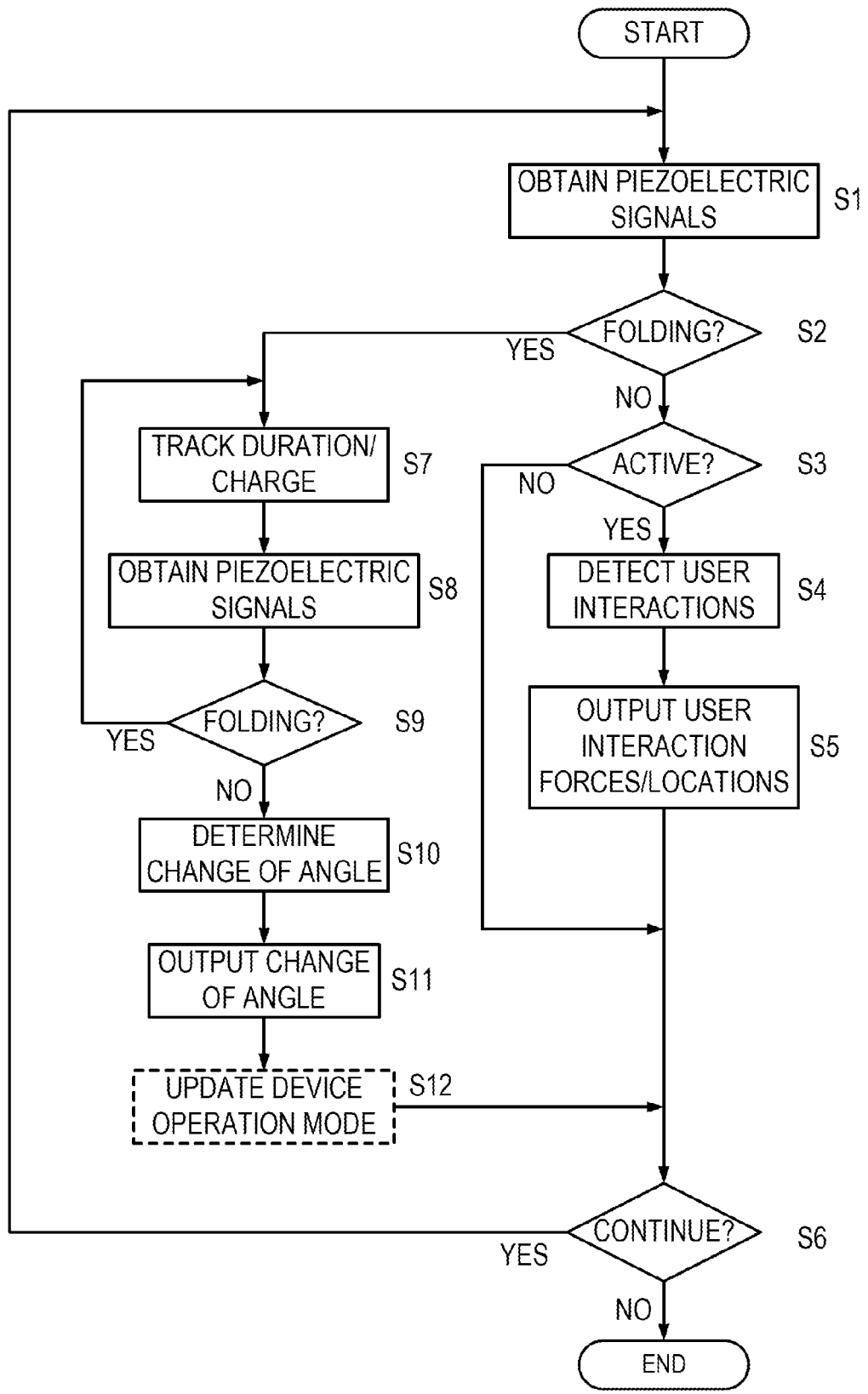
FIG. 14 is a process flow diagram of an exemplary method of controlling a first electronic device.

Referring also to FIG. 14, a process flow diagram of an example control method is shown.

Piezoelectric signals are received from the first and/or second electrodes 7, 8 by the touch controller 3 (step S1).

Figure 15:
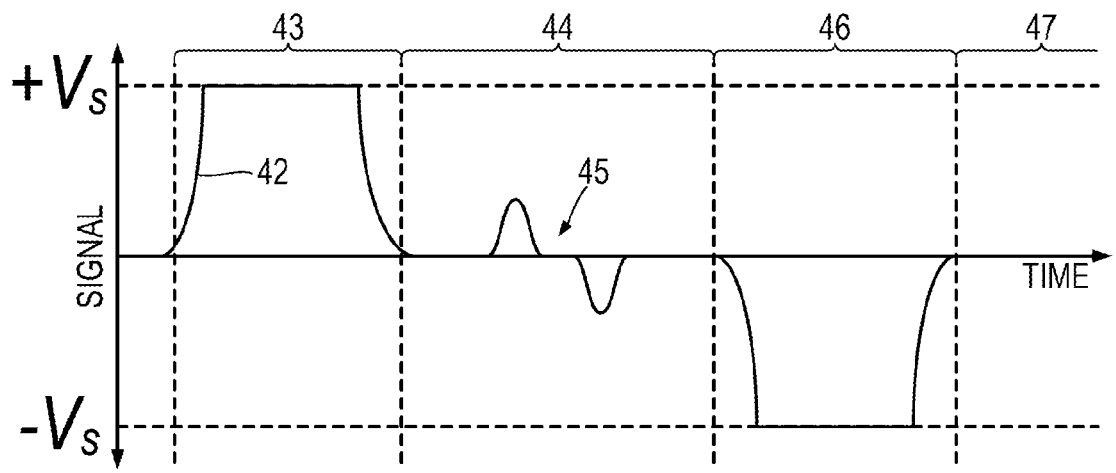
FIG. 15 illustrates a first example of estimating a radius of curvature of a flexible touch panel based on saturation of amplifier outputs.
Figure 16:
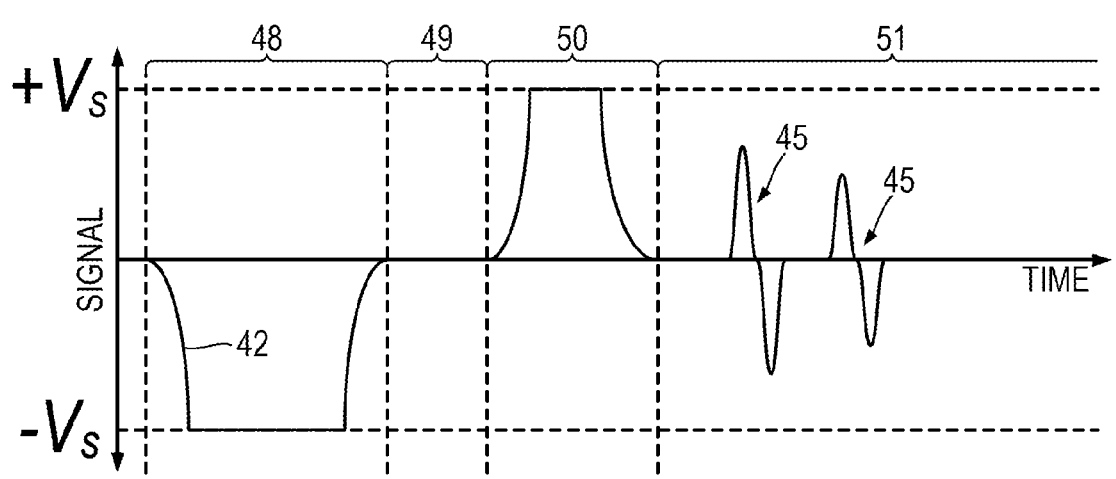
FIG. 16 illustrates a second example of estimating a radius of curvature of a flexible touch panel based on saturation of amplifier outputs.

The touch controller 3 determines whether the received piezoelectric signals are indicative of a folding/unfolding event (step S2). For example, a folding/unfolding event may correspond to saturation of amplifier outputs corresponding to one or more first or second electrodes 7, 8 (FIGS. 15, 16). Alternatively, a folding/unfolding event may correspond to one or more piezoelectric signals exceeding a threshold pre-calibrated to distinguish between user interactions and a folding/unfolding event.

If no folding/unfolding event is detected (step S2|No), and the electronic device 30 is in an active, awake or lull power mode (step S3|Yes), the touch controller 3 detects any active user interactions using piezoelectric signals and/or capacitance measurements (step S4), and then outputs the user interaction locations (step S5). In some examples, the touch controller 3 will also output an estimated force corresponding to each user interaction. Whilst the electronic device 30 remains active (step S5|Yes), further piezoelectric signals are obtained (step S1).

If no folding/unfolding event is detected (step S2|No), and the electronic device 30 is in a low power or sleep mode (step S3|No), then detection of user interactions is skipped and the electronic device 30 continues to monitor the piezoelectric signals (step S5|Yes, step S1).

If a folding/unfolding event is detected (step S2|Yes), then the touch controller 3 starts tracking a total duration and/or total charge associated with the folding/unfolding event (step S7).

Further piezoelectric signals are obtained (step S8), and the touch controller 3 determines whether the folding/unfolding event is still occurring (step S9). The determination may be made as described hereinbefore (at step S2). Alternatively, the conditions for determining the end of a folding/unfolding event (step S9|No) may be different to the conditions for determining the start of a folding/unfolding event (step S2|Yes). For example, a threshold signal level for the end of a folding/unfolding event (step S9|No) may be set lower than a threshold signal level for the start of a folding/unfolding event (step S2|Yes).

If the folding/unfolding event is still in progress (step S9|Yes), then the touch controller 3 continues tracking a total duration and/or total charge associated with the folding/unfolding event (step S7), and further piezoelectric signals are obtained (step S8).

Once the folding/unfolding event has finished (step S9|No), the touch controller 3 determines, based on the total duration and/or total charge which were recorded, an estimated change Δθ in the angle θ (step S10). The change Δθ in the angle θ and/or the new angle θ are output (step S11).

Based on the output change Δθ in the angle θ and/or the new angle θ, the first electronic device 30 may switch operating, modes (step S12). For example, the electronic device 30 may switch from an active mode to a low power, idle or sleep mode, or the electronic device. 30 may switch from tablet mode to a laptop mode.

Referring also to FIG. 15, a schematic example is shown for a case that a folding/unfolding event causes a charge amplifier connected to a first or second electrode 7, 8 to become saturated.

FIG. 15 plots a schematic example of a piezoelectric signal 42 against time. During a first, unfolding period 43, the piezoelectric signal 42 saturates (to a positive rail voltage $+V_s$) with a polarity indicating an unfolding. The touch controller 3 detects the unfolding, and once this process is completed, initiates a second period 44 corresponding to detecting user interactions 45. After the first, unfolding period 43 has finished, the touch controller 3 may need to re-calibrate parameters used for piezoelectric force and/or capacitance detection, for example the touch controller 3 may need to re-calibrate DC-offsets.

During a third, folding period 46, the piezoelectric signal 42 becomes saturated (to a negative rail voltage $-V_s$) with the opposite polarity to the unfolding period 43. The touch controller 3 detects the folding, and once this process is completed, initiates a fourth period 47 corresponding to a low power, idle or sleep mode.

In the example of FIG. 15, the touch controller 3 may determine or estimate a change in the radius of curvature $R_1$, $R_2$, about the hinge 32, corresponding to a change $\Delta\theta$ in the angle $\theta$, based on the total duration of the first or third periods 43, 46. Based on typical pre-calibrated opening and/or closing rates of a human user, the touch controller 3 may estimate the difference between, for example, completely or partially folding the first electronic device 30. In some examples, explicit calculation of estimate a change in the radius of curvature $R_1$, $R_2$, the change $\Delta\theta$ and/or the angle $\theta$ may be omitted and the parameters of the piezoelectric signal 42 may be directly correlated to an unfolding or folding event.

Referring also to FIG. 16, a second schematic example is shown for the case that a folding/unfolding event causes a charge amplifier connected to a first or second electrode 7, 8 to become saturated, FIG. 16 plots a schematic example of a piezoelectric signal 42 against time. During a fifth, folding period 48, the piezoelectric signal 42 becomes saturated with a polarity indicating folding of the first electronic device 30, causing the touch controller 3 to initiate a sixth period 49 of a low power idle or sleep mode.

During a seventh, unfolding period 50, the piezoelectric signal 42 becomes saturated with a polarity indicating unfolding of the first electronic device 30. However, the duration of the seventh period 50 is relatively shorter than the fifth period 48, indicating that the first electronic device 30 have been only partially unfolded to the intermediate configuration 41. After detecting a partial unfolding based on the duration of the seventh, unfolding period 50, the touch controller may activate an appropriate input mode, and during an eighth, active period 51 the touch controller may detect user interactions based on piezoelectric signals 42 and/or capacitance measurements.

In some examples, explicit calculation of estimate a change in the radius of curvature $R_1$, $R_2$, the change $\Delta\theta$ and/or the angle $\theta$ may be omitted and the parameters of the piezoelectric signal 42 may be directly correlated to a complete or partial folding or unfolding event.

Saturation of an amplifier may occur in a touch controller 3 for a piezoelectric force sensing touch panel because the amplifier requires sufficient gain to detect the relatively weak signals resulting from a user interaction. The relatively much larger strains associated with large-scale bending or folding of a flexible touchscreen 18 or flexible touch panel 21 may cause an amplifier calibrated for detecting user interactions to saturate. Although changes in the radius of curvature $R_1$, $R_2$, of the flexible touchscreen 18 or flexible touch panel 21 may be tracked using the duration of saturation, the result of the saturation is that information about the bending is lost.

Estimates may be improved by analysing the rising and falling edges of a saturated folding/unfolding event, in order to estimate a rate at which a hinge 32 has been actuated. Using the rising and falling edges to estimate initial and final velocities of the movement may be useful to refine estimates of the change in radius of curvature $R_1$, $R_2$, and the associated angle $\theta$ of the hinge 32. However, improved estimates may also be obtained by changing the gain of amplifiers reading out piezoelectric signals from at least some of the first and/or second electrodes 7, 8 to avoid saturation of folding/unfolding signals.

Figure 17:
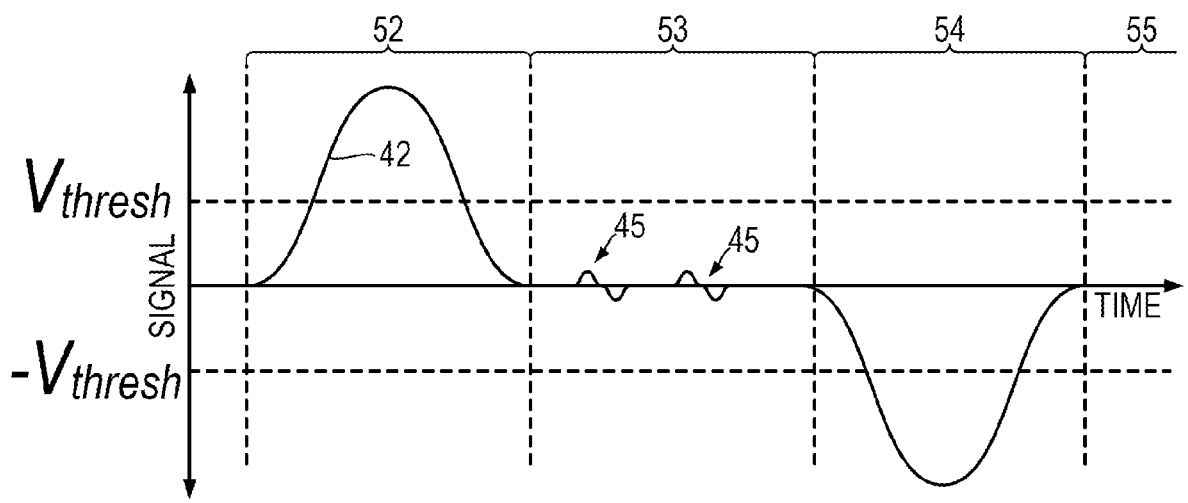
FIG. 17 illustrates a second example of estimating a radius of curvature of a flexible touch panel based a total recorded piezoelectric charge.

Referring also to FIG. 17, a schematic example is shown for a case that a folding/unfolding event does not cause a charge amplifier connected to a first or second electrode 7, 8 to become saturated.

FIG. 17 plots a schematic example of a piezoelectric signal 42 against time. During a ninth, unfolding period 52, the piezoelectric signal 42 exhibits a broad and relatively high peak in the signal 42, which exceeds a pre-calibrated threshold $V_{thresh}$, with a polarity indicating an unfolding action. The threshold $V_{thresh}$ may be pre-calibrated using data from regular user interactions, and may be set so as to exclude regular user interactions such as taps, swipes and so forth. In effect, the threshold $V_{thresh}$ should be set high enough that only a relatively extreme strain such as resulting from large-scale bending, of the flexible touchscreen 18 or flexible touch panel 21 will exceed the threshold $V_{thresh}$. The touchscreen controller 3 may maintain a buffer of previous signal 42 values, so that when the threshold $V_{thresh}$ is exceeded, the rising edge may be traced back and the total charges associated with the unfolding (or folding) event may be numerically integrated. By comparing the total charge recorded against calibration data obtained for known changes in the radius of curvature $R_1$, $R_2$ and the corresponding angle $\theta$, the touch controller 3 may identify that the first electronic device 3 has been opened and activated a tenth, active period 53, during which user interactions 45 may be detected using piezoelectric signals 42 and/or capacitance measurements.

During an eleventh, folding period 54, a peak having a polarity indicating a folding event exceeds the negative of the threshold $-V_{thresh}$, triggering the touch controller 3 to again track the total charge recorded. The touch controllers determines that the first electronic device 3 has been closed to the folded configuration, and triggers a twelfth period 55 in a low power idle or sleep mode.

During a third, folding period 46, the piezoelectric signal 42 becomes saturated with the opposite polarity to the unfolding period 43. The touch controller 3 detects the folding, and once this process is completed, initiates a fourth period 47 corresponding to a low power idle or sleep mode.

In some examples, explicit calculation of estimate a change in the radius of curvature $R_1$, $R_2$, the change $\Delta\theta$ and/or the angle $\theta$ may be omitted and the total charge recorded for a peak exceeding the threshold $V_{thresh}$ may be directly correlated to a corresponding angle and/or operating mode of the first electronic device 30.

Estimates of the change in the changes in the radius of curvature $R_1$, $R_2$ and the corresponding angle $\theta$ may be further refined by taking into account the slopes of rising and falling edges of folding/unfolding peaks. For example, if a decay rate of a signal on a charge amplifier output is measured during a calibration step, then the decay rate may be adjusted for based on the gradient of the piezoelectric signal 42, in order to obtain a more accurate estimate of the total charge recorded.

Although more accurate for detecting folding and unfolding events, decreasing the gain of a charge amplifier will also reduce the amplitude of signals corresponding to user interactions. Another issue is that the quantisation error of an analog-to-digital convertor (ADC) set to capture the signals from folding and unfolding events ma have insufficient resolution to capture user interactions accurately. There are several approaches to mitigate such problems. For example, each amplifier output, or at least some amplifier outputs, may be connected to a pair of ADCs in which one is set to a relatively narrow voltage range to capture user interactions whilst the other is set to a relatively wide voltage range to capture folding/unfolding events. This would only need to be done for first or second electrodes 7, 8 proximate to the hinge 32, or for one or two electrode 7, 8 which span the hinge 32, minimising any added complexity.

Additionally or alternatively, amplifiers connected to first or second electrodes 7, 8 proximate to, or one or two spanning the hinge 32, may be read using more precise ADCs then the other electrodes 7, 8. For example, amplifier outputs corresponding to most of the electrodes 7, 8 may be read using 8-bit ADCs, and an amplifier output corresponding to an electrode 7, 8 running along the hinge 32 may be read using a 12- or 16-bit ADC. For a given bandwidth, more precise ADCs are usually more expensive, however, the impact is mitigated by the fact that high precision to catch user interactions and folding/unfolding events on the same channel is not required for every electrode 7, 8.

Figure 18:
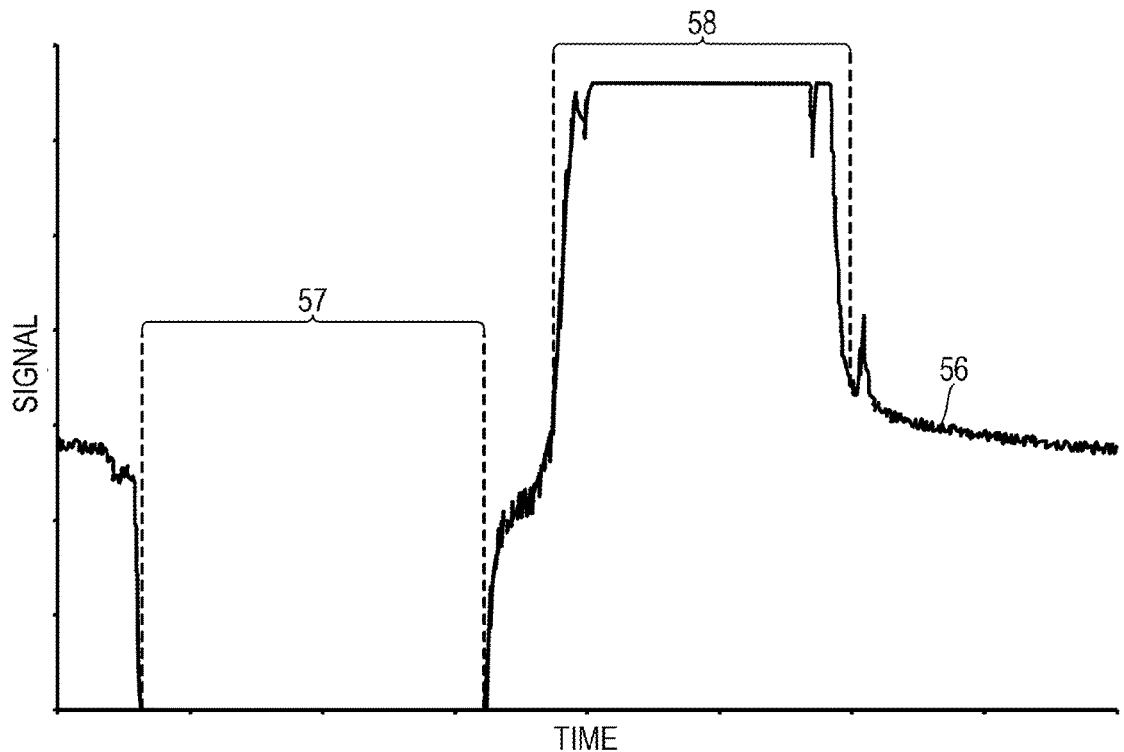
FIG. 18 presents an experimental example of detecting folding and unfolding based on saturation of amplifier outputs.

Referring also to FIG. 18, experimentally measured piezoelectric signals 56 are shown.

The data shown in FIG. 8 were obtained using an electrode 7, 8 arranged on top of and parallel to a hinge 32. For these data, negative polarity indicates a folding event 57 and positive polarity indicates an unfolding event 58. Based on the total durations of folding events 57 and unfolding events 58, it was possible to switch the display of an example of the first electronic device 30 of the first configuration 30A on and off by respectively unfolding and folding the first electronic device 30.

Low Power Triggering Switch

The magnitude of piezoelectric signals 42, 56 generated by electrodes 7, 8 of a flexible touchscreen 18 or flexible touch panel 21 in response to large-scale bending such as folding or unfolding may be utilised for waking up an electronic device such as the first electronic device 30 from a very low power idle or sleep mode.

In particular, the piezoelectric signals 42, 56 generated by electrodes 7, 8 of a flexible touchscreen 18 or flexible touch panel 21 are generated by the applied strain, and do not require any driving signal from the touch controller 3.

Figure 19:
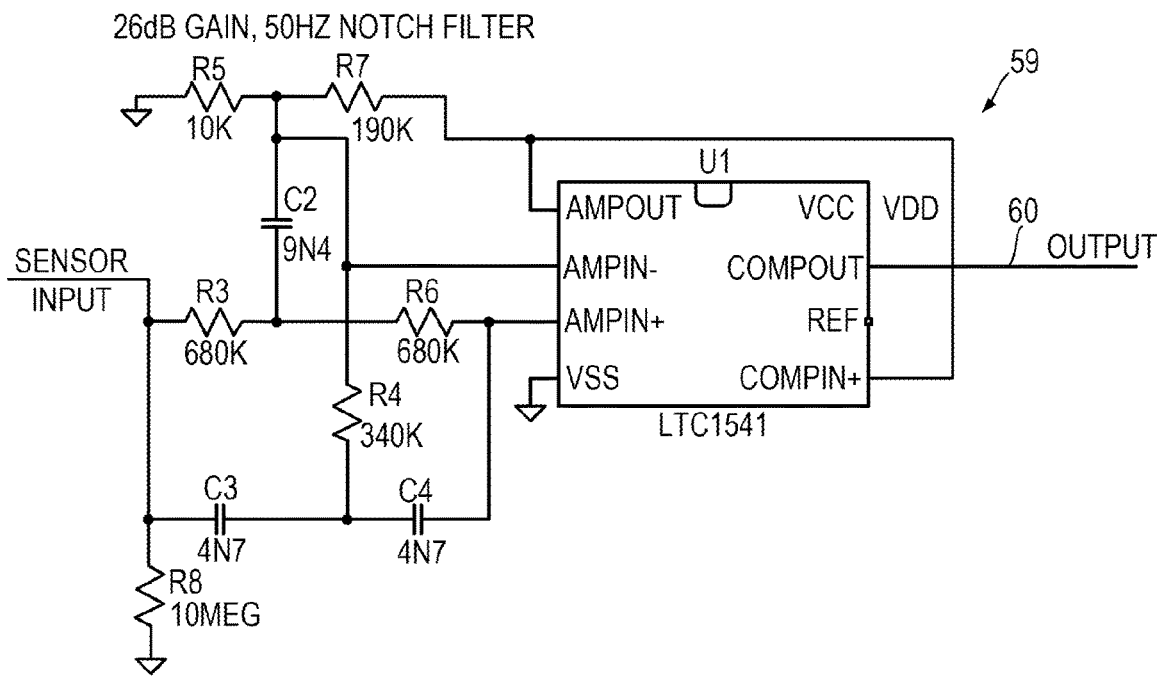
FIG. 19 is a circuit diagram of a low power circuit for detecting piezoelectric signals.

Referring also to FIG. 19, a low power excitation detection circuit 59 is shown.

The circuit shown in FIG. 19 may be connected to an electrode 7, 8 which is proximate to, or spans, a hinge 32 of the first electronic device 30. The circuit 19 utilises micropower signal conditioning electronics to produce a 5V digital output signal 60 when excited by a piezoelectric signal 42, 56 generated by an electrode 7, 8. The output signal 60 may be used to wake-up other components of the electronic device 30 such as, for example, the touchscreen controller 3, the display such as flexible display 19, wireless communications, and so forth.

The circuit 59 uses a LTC1541 integrated circuit to provide sensor gain and conversion to digital-compatible output using very low power. The front-end filter is needed to eliminate spurious signals caused by pick-up. The quiescent current draw of the circuit 59 was measures as 2.6 µA.

Second Electronic Device

Figure 20:
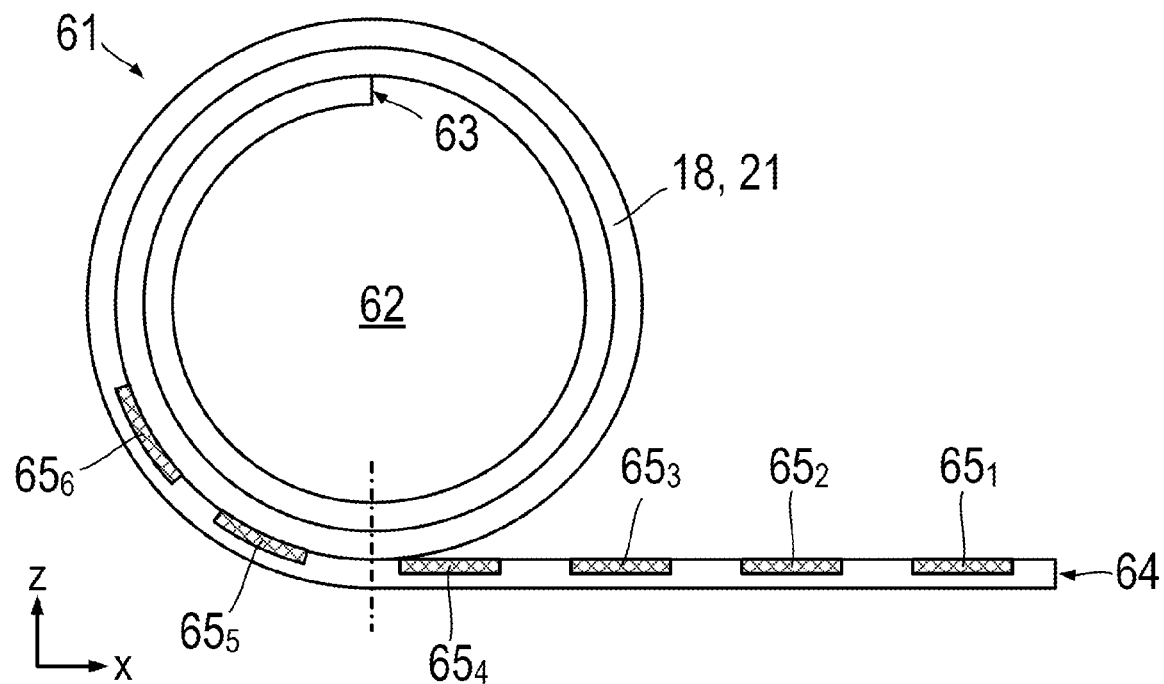
FIG. 20 is a cross-section of a second electronic, device.

Referring also to FIG. 20, a second electronic device 61 is shown.

The second electronic device 61 includes a flexible touchscreen 18 or flexible touch panel 21 which may be rolled-up into a substantially cylindrical configuration, for example a scroll-like configuration 62 having an inner end 63 rolled up inside the scroll 62 and an outer end 64 at the outside of the scroll 62. The flexible touchscreen 18 or flexible touch panel 21 may be integrated with a flexible battery (not shown) and/or flexible electronics (not shown) providing the touch controller 3 and optionally data processing capabilities, so that the scroll 62 may function as an independent device. Alternatively, the scroll 62 may be configured for wired or wireless coupling to an external device which may provide the touch controller 3, a display driver (not shown), power and/or data processing capabilities. In some examples the second electronic device 61 may be a roll-up keyboard and/or touch enabled display.

The second electronic device 61 includes electrodes 65 running parallel to an axis about which the scroll 62 is rolled-up. The electrodes 65 may be first or second electrodes 7, 8, and the other electrodes 7, 8 may be substantially perpendicular to the axis about which the scroll 62 is rolled-up. Electrodes $65_1$, $65_2$, $65_3$, $65_4$, $65_5$, $65_6$ are shown in sequence from the outer end 64 of the flexible touchscreen 18 or flexible touch panel 21. Further electrodes $65_n$ for n>6 are not shown for clarity of the figure, but the second electronic device 61 may include any number N of electrodes $65_1, \ldots, 65_n, \ldots, 65_N$.

The substantially cylindrical configuration of the scroll corresponds to a predetermined radius of curvature $R_{scroll}$ and the touch controller 3 may be pre-calibrated to determine ss when one or more of the electrodes $65_n$ transitions to, or from, the substantially cylindrical scroll-like configuration 62 by comparing estimated changes in the radius of curvature $R_n$ around an $n^{th}$ electrode $65_n$ to the predetermined radius of curvature $R_{scroll}$. In the same way as for the first electronic device 30, the second electronic device 61 may track changes in the radius of curvature $R_n$ around an $n^{th}$ electrode $65_n$ based on monitoring a duration for which a corresponding amplifier statures, or based on monitoring a total charge associated with a peak of a piezoelectric signal 42 which exceeds a threshold $V_{thresh}$ (see FIG. 22).

In some examples explicit estimation of the radius of curvature $R_n$ around an $n^{th}$ electrode $65_n$ may be omitted, and transitions to, or from, the substantially cylindrical scroll-like configuration 62 may be determined based directly on the piezoelectric signals $42_n$ from the $n^{th}$ electrode $65_n$ (and optionally adjacent electrodes $65_{n-1}$, $65_{n+1}$, and so forth).

Figure 21:
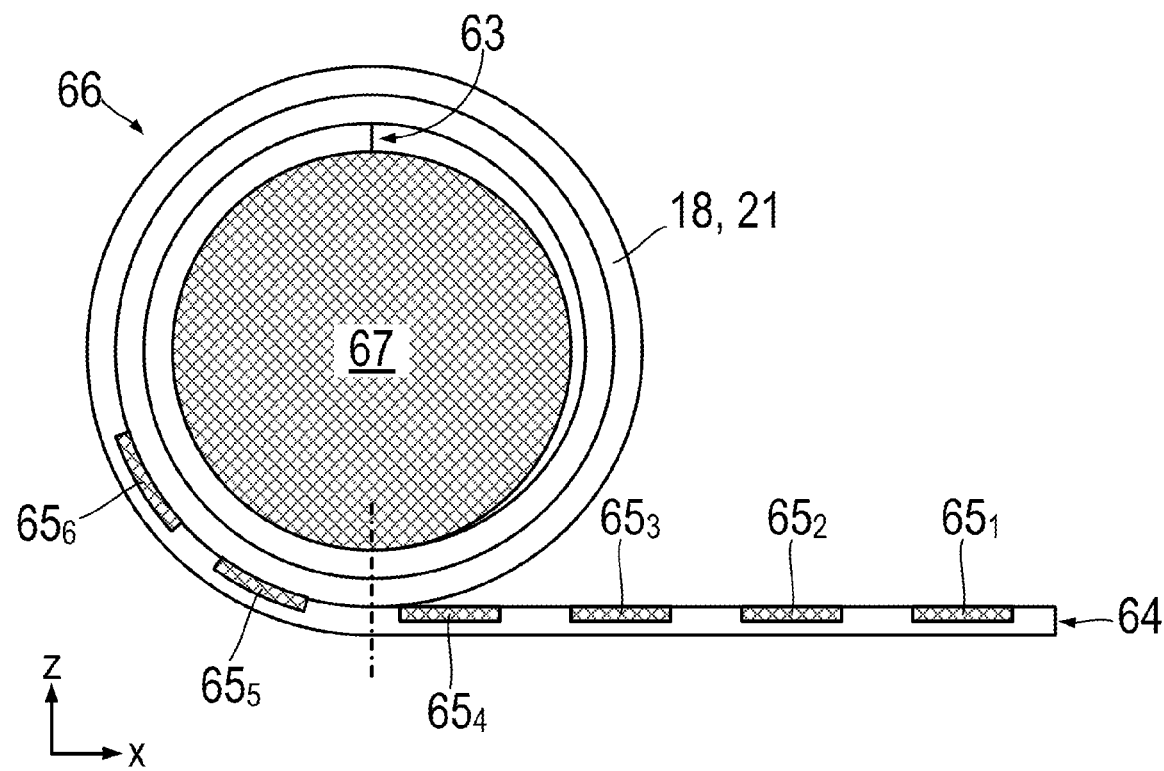
FIG. 21 is a cross-section of a third electronic device.

Referring also to FIG. 21, a third electronic device 66 is shown.

The third electronic device 66 is the same as the second electronic device 61, except that it includes a roller 67 about which the flexible touchscreen 18 or flexible touch panel 21 may be wrapped. The roller 67 may help to ensure a consistent change in the local radius of curvature $R_n$ around an $n^{th}$ electrode $65_n$ as it is rolled into or out of the substantially cylindrical scroll-like configuration 62.

The flexible touchscreen 18 or flexible touch panel is preferably connected to the roller 67 along the inner end 63. The roller 67 may include the touch controller 3, a display driver (not shown), a power supply (not shown), one or more processors (not shown), memory (not shown), a wireless communications module (not shown) and so forth. In other words, the roller 67 may house the components necessary for the third electronic device 66 to function as a smart phone, a tablet computer, and similar devices.

In some examples explicit estimation of the radius of curvature $R_n$ around an $n^{th}$ electrode $65_n$ may be omitted, and transitions to, or from, the substantially cylindrical scroll-like configuration 62 may be determined based directly on the piezoelectric signals $42_n$ from the $n^{th}$ electrode $65_n$ (and optionally adjacent electrodes $65_{n-1}$, $65_{n+1}$ and so forth).

Figure 22:
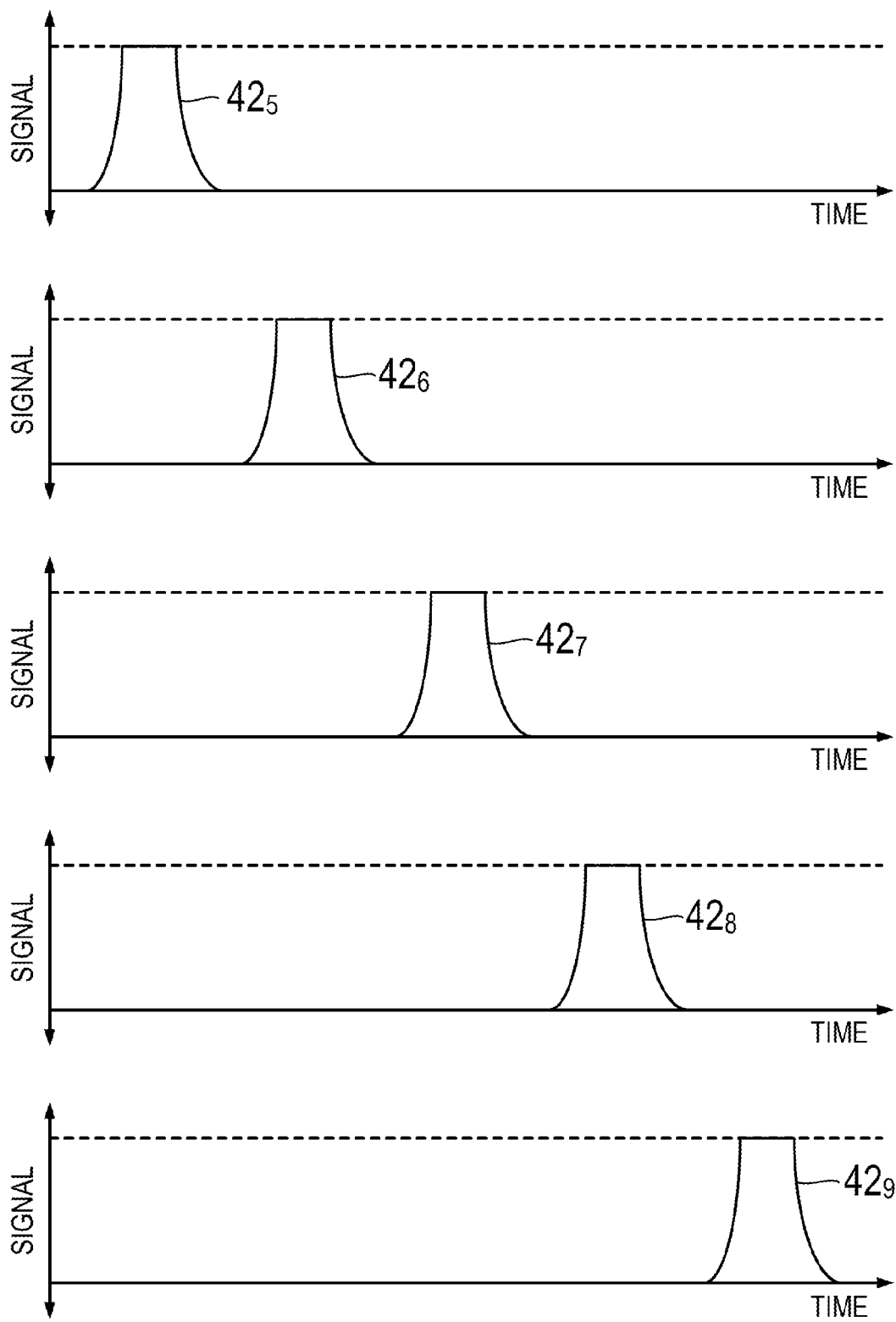
FIG. 22 illustrates tracking the rolling and/or unrolling of a second or third electronic device.

Referring also to FIG. 22, as the second or third electronic device 61, 66 is rolled-up or unrolled, the electrodes $65_n$ will display corresponding piezoelectric signals $42_n$ indicative of changing between a flat configuration and the predetermined radius of curvature $R_{scroll}$ in sequence.

For example, if the second or third electronic device 61, 66 was to be unrolled starting from the configuration illustrated in FIG. 20 or 21, the first electrode $65_n$ to experience an unrolling event would be the fifth electrode $65_5$, and a piezoelectric signal $42_5$ output from a corresponding charge amplifier may become saturated (to a positive or negative supply rail, depending on the polarisation of the layer of piezoelectric material 9).

If the second or third electronic device 61, 66 continues to be unrolled, a saturated piezoelectric signal $42_6$ will then be observed for the sixth electrode $65_6$, and so forth.

In this way, the touch controller 3 may track the rolling and unrolling of the second or third electronic device 61, 66 between a flat configuration and the substantially cylindrical scroll-like configuration 62.

In other examples, rolling and unrolling may be detected by piezoelectric signals $42_n$ exceeding a threshold $V_{thresh}$, instead of saturating.

The second or third electronic device 61, 66 may be configured to enter a low power idle or sleep mode in response to any part of the flexible touchscreen 18 or flexible touch panel 21 having a radius of curvature $R_n$ with a pre-calibrated range of the predetermined radius $R_{scroll}$. The second or third electronic device 61, 66 may then wake-up to a full power mode when the flexible touchscreen 18 or flexible touch panel 21 is fully unrolled.

In other examples, the touch controller 3 of the second or third electronic device 61, 66 may determine and track the fraction f of the flexible touchscreen 18 or flexible touch panel 21 which is rolled up in the substantially cylindrical scroll-like configuration 62 and the fraction 1-f of the flexible touchscreen 18 or flexible touch panel 21 which is unrolled and flat. Based on the fractions f, 1-f, the touch controller 3 may only measure user interactions from the fraction 1-f of the flexible touchscreen 18 or flexible touch panel 21 which is unrolled and flat. Furthermore, when the second or third electronic device 61, 66 includes a flexible display 19 laminated to, or integrated with, the flexible touch panel 21, a display driver (not shown) of the second or third electronic device 61, 66 may be configured to only display output on the unrolled fraction 1-f. The second or third electronic device 61, 66 may be configured to re-scale display output provided from an application and/or operating system executed by one or more processors (not shown) of the second or third electronic device 61, 66, so that the display output fits on the unrolled fraction 1-f.

Although the second and third electronic devices 61, 66 have been described as having electrodes $65_n$ oriented parallel to an axis about which the devices 61, 66 are rolled-up, the orientation need not be precise. For example, the electrodes 65 (which may be first or second electrodes 7, 8) may be oriented at an angle of less than 30 degrees, less than 15 degrees, less than 10 degrees or less than 5 degrees to the axial direction about which the second or third electronic devices 61, 66 are rolled-up.

Modifications

It will be appreciated that various modifications may be made to the embodiments hereinbefore described. Such modifications may involve equivalent and other features which are already known in the design, manufacture and use of flexible touch panels, flexible displays, flexible electronics, and component parts thereof and which may be used instead of, or in addition to, features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. An apparatus comprising:
    a flexible touch panel comprising a layer of piezoelectric material arranged between a plurality of first electrodes and at least one second electrode; and
    a touch controller connected to the plurality of first electrodes and configured to:
        receive one or more piezoelectric signals from the plurality of first electrodes;
        determine whether the one or more piezoelectric signals are indicative of a change in a bending state corresponding to one or more radii of curvature of the flexible touch panel; and
        in response to a determination that the one or more piezoelectric signals are indicative of a change in the bending state, to determine the change in the bending state based on tracking at least one value associated with the change in the bending state; and
        in response to a determination that the one or more piezoelectric signals are not indicative of a change in the bending state, and if the apparatus is in an awake mode, to determine a locations corresponding to one or more user interactions based on measurements comprising measurements of at least one of the one or more piezoelectric signals;
        wherein the touch controller determines the change in the bending state based on the tracking of the at least one value associated with the bending state by tracking at least one value comprising a total duration associated with the change in the bending state.

2. The apparatus according to claim 1, wherein the touch controller is configured to determine the change in the bending state of the flexible touch panel based on charge generated on one or more of the plurality of first electrodes corresponding to a hinge.

3. The apparatus according to claim 1, wherein the flexible touch panel is configured to enable the apparatus to be rolled-up into a substantially cylindrical configuration.

4. The apparatus according to claim 3, wherein the touch controller is configured to determine the change in the bending state corresponding to a fraction of the flexible touch panel which is rolled up in the substantially cylindrical configuration.

5. An electronic device comprising the apparatus according to claim 1,
wherein the electronic device is configured to switch between two or more operating modes in dependence upon the bending state of the flexible touch panel, wherein the electronic device is configured to:
to enter a low power mode in response to determining that the change in the bending state corresponds to one or more radii of curvature of the flexible touch panel being less than a first predetermined threshold; and
to enter a full power mode in response to determining that the change in the bending state corresponds to one or more radii of curvature of the flexible touch panel being greater than a second predetermined threshold.

6. An electronic device comprising the apparatus according to claim 1, wherein the electronic device is configured to switch between two or more operating modes in dependence upon the change in the bending state of the flexible touch panel, wherein the flexible touch panel is supported within a frame which comprises one hinge, the frame and the flexible touch panel being foldable about the hinge at an angle, wherein the frame comprises one or more displays, and wherein the electronic device is configured:
to operate in a tablet mode in response to determining that the angle of the hinge is more than an unfolded angle; and
to operate in a laptop mode in response to determining that the angle of the hinge is between the unfolded angle and a folded angle.

7. An electronic device comprising the apparatus according to claim 1, wherein the electronic device is configured to switch between two or more operating modes in dependence upon the change in the bending state of the flexible touch panel, wherein the flexible touch panel is configured to enable the apparatus to be rolled-up into a substantially cylindrical configuration, wherein the flexible touch panel is laminated to a flexible display, wherein the electronic device is configured to only receive touchscreen input from a fraction of the flexible touch panel which is unrolled, and wherein the electronic device is configured to only display output using a region of the flexible display corresponding to the fraction of the flexible touch panel which is unrolled.

8. The apparatus according to claim 1, wherein the touch controller determines the locations corresponding to one or more user interactions based on measurements comprising measurements of the at least one of the one or more piezoelectric signals and capacitive measurements of the plurality first electrodes.

9. The apparatus according to claim 1, wherein the touch controller determines the change in the bending state based on tracking of the at least one value by tracking at least two values comprising the total duration associated with the change in the bending state and a total charge associated with the change in the bending state.

10. An apparatus comprising:
a flexible touch panel comprising a layer of piezoelectric material arranged between a plurality of first electrodes and at least one second electrode; and
a touch controller connected to the plurality of first electrodes and configured to:
receive one or more piezoelectric signals from the plurality of first electrodes;
determine whether the one or more piezoelectric signals are indicative of a change in a bending state corresponding to one or more radii of curvature of the flexible touch panel; and
in response to a determination that the one or more piezoelectric signals are indicative of a change in the bending state, to determine the change in the bending state based on tracking at least one value associated with the change in the bending state; and
in response to a determination that the one or more piezoelectric signals are not indicative of a change in the bending state, and if the apparatus is in an awake mode, to determine locations corresponding to one or more user interactions based on measurements comprising measurements of at least one of the one or more piezoelectric signals;
wherein the touch controller determines the change in the bending state based on the tracking of the at least one value associated with the change in the bending state by tracking at least one value comprising a total charge associated with the change in the bending state.

11. An apparatus comprising:
a flexible touch panel comprising a layer of piezoelectric material arranged between a plurality of first electrodes and at least one second electrode; and
a touch controller connected to the plurality of first electrodes and configured to:
receive one or more piezoelectric signals from the plurality of first electrodes;
determine whether the one or more piezoelectric signals are indicative of a change in a bending state corresponding to one or more radii of curvature of the flexible touch panel; and
in response to a determination that the one or more piezoelectric signals are indicative of a change in the bending state, to determine the change in the bending state based on tracking at least one value associated with the bending state; and
in response to a determination that the one or more piezoelectric signals are not indicative of a change in the bending state, and if the apparatus is in an awake mode, to determine locations corresponding to one or more user interactions based on measurements comprising capacitance measurements of the plurality of first electrodes;
wherein the touch controller determines the change in the bending state based on the tracking the at least one value associated with the change in bending state by tracking at least one value comprising a total duration associated with the change in the bending state.

12. The apparatus according to claim 11, wherein the touch controller determines the change in the bending state based on tracking the at least one value by tracking at least two values comprising the total duration associated with the change in the bending state and a total charge associated with the change in the bending state.

13. An apparatus comprising:
a flexible touch panel comprising a layer of piezoelectric material arranged between a plurality of first electrodes and at least one second electrode; and
a touch controller connected to the plurality of first electrodes and configured to:
receive one or more piezoelectric signals from the plurality of first electrodes;
determine whether the one or more piezoelectric signals are indicative of a change in a bending state corresponding to one or more radii of curvature of the flexible touch panel; and in response to a determination that the one or more piezoelectric signals are indicative of a change in the bending state, to determine the change in the bending state based on tracking at least one value associated with the bending state; and in response to a determination that the one or more piezoelectric signals are not indicative of a change in the bending state, and if the apparatus is in an awake mode, to determine locations corresponding to one or more user interactions based on measurements comprising capacitance measurements of the plurality of first electrodes;

wherein the touch controller determines the change in the bending state based on the tracking the at least one value associated with the bending state by tracking at least one value comprising a total charge associated with the change in the bending state.

14. The apparatus according to claim 13, wherein the touch controller determines the locations corresponding to one or more user interactions based on measurements including the capacitive measurements of the plurality of first electrodes and measurements of at least one of the one or more piezoelectric signals.

* * * * *